(12) United States Patent
Gulwani et al.

(10) Patent No.: US 10,664,530 B2
(45) Date of Patent: May 26, 2020

(54) CONTROL OF AUTOMATED TASKS EXECUTED OVER SEARCH ENGINE RESULTS

(71) Applicant: Microsoft Technology Licensing, LLC, Redmond, WA (US)

(72) Inventors: Sumit Gulwani, Bellevue, WA (US); Oleksandr Polozov, Seattle, WA (US); Saurabh Kumar Tiwary, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 731 days.

(21) Appl. No.: 14/619,702

(22) Filed: Feb. 11, 2015

(65) Prior Publication Data
US 2015/0254353 A1 Sep. 10, 2015

Related U.S. Application Data

(60) Provisional application No. 61/950,065, filed on Mar. 8, 2014.

(51) Int. Cl.
| | |
|---|---|
| *G06F 17/00* | (2019.01) |
| *G06F 16/00* | (2019.01) |
| *G06F 16/951* | (2019.01) |
| *G06F 16/903* | (2019.01) |
| *G06F 16/33* | (2019.01) |

(52) U.S. Cl.
CPC ........ *G06F 16/951* (2019.01); *G06F 16/3344* (2019.01); *G06F 16/90344* (2019.01)

(58) Field of Classification Search
CPC ......... G06F 17/30864; G06F 17/30684; G06F 17/30985
See application file for complete search history.

(56) References Cited

U.S. PATENT DOCUMENTS

| | | | |
|---|---|---|---|
| 6,778,979 B2 * | 8/2004 | Grefenstette | ....... G06F 16/3323 |
| 7,983,997 B2 | 7/2011 | Allen et al. | |
| 8,589,366 B1 | 11/2013 | Younes et al. | |

(Continued)

FOREIGN PATENT DOCUMENTS

WO 2007011714 A2 1/2007

*Primary Examiner* — Tony Mahmoudi
*Assistant Examiner* — Thai V Dang
(74) *Attorney, Agent, or Firm* — Medley, Behrens & Lewis, LLC

(57) ABSTRACT

Various technologies described herein pertain to controlling execution of an automated search task on search results returned by a search engine. The search results are received, where the search results are returned by the search engine responsive to the search engine receiving a seed query. An instantiation of a parameterized query for the automated search task is executed over documents specified by the search results, where the instantiation of the parameterized query describes a linguistic pattern, a structural pattern, and a visual pattern. Further, a set of answer strings is extracted from the documents. The answer strings in the set match the linguistic pattern, the structural pattern, and the visual pattern. The search engine is controlled to provide an output in response to the user search query, the output being based on the set of answer strings extracted from the documents.

20 Claims, 13 Drawing Sheets

(56) References Cited

U.S. PATENT DOCUMENTS

| | | | | |
|---|---|---|---|---|
| 8,868,535 B1* | 10/2014 | Paiz | ............... | G06F 16/951 |
| | | | | 707/706 |
| 2004/0010493 A1* | 1/2004 | Kojima | ............... | G06F 16/951 |
| 2008/0306968 A1 | 12/2008 | Nandhra | | |
| 2011/0113315 A1 | 5/2011 | Datha et al. | | |
| 2011/0125734 A1* | 5/2011 | Duboue | ............... | G09B 7/00 |
| | | | | 707/723 |
| 2011/0320187 A1* | 12/2011 | Motik | ............... | G06F 17/278 |
| | | | | 704/9 |
| 2012/0166413 A1* | 6/2012 | LeBaron | ............... | G06F 16/958 |
| | | | | 707/709 |

* cited by examiner

JOE SMITH — 800

PICTURE

PRINCIPAL RESEARCHER

<u>CONTACT INFORMATION</u>
- ADDRESS: 123 Z STREET, CITY, STATE, ZIP CODE
- EMAIL: JOE.SMITH@COMPANY-INC.COM
- PHONE: (234) 500-6789
- FAX: (234) 600-6789

CONTROL OF AUTOMATED TASKS EXECUTED OVER SEARCH ENGINE RESULTS

CROSS-REFERENCE TO RELATED APPLICATION

This application claims priority to U.S. Provisional Patent Application No. 61/950,065, filed on Mar. 8, 2014, and entitled "AUTOMATING SEARCH STRATEGIES OVER SEMI-STRUCTURED WEB DATA", the entirety of which is incorporated herein by reference.

BACKGROUND

Wide-spread utilization of search engines has caused changes in the way people locate information. Traditionally, research for information was commonly conducted by searching through printed documents (e.g., in libraries, etc.). More recently, search engines have become more commonly utilized to find information, where a search engine can perform a search over documents of the World Wide Web (the Web) to retrieve information. For example, significant portions of online users currently use search engines to find information on the Web, with many using search engines daily. Moreover, research undertaken by college students, faculty, professional researchers, and the like often begins with a search engine query. Search engines can dictate habits of knowledge discovery on the Web.

Even though many queries submitted to search engines represent one-off tasks, a portion of the queries are repetitive. For instance, end users often process batch data by making a series of similar queries to a search engine. A typical example is finding a similar piece of information about items in a given list (e.g., acquiring contact information for people in a list, getting bibliography information for a list of articles, etc.).

Moreover, factoid questions (e.g., "Who invented radio?", "What is the population of Germany?", "When is 'XYZ Movie' going to be released?", etc.) can constitute a portion of user queries. Search engines have recently been designed to handle some factoid questions, introducing a notion of a micro-segment of queries—a specific category of questions, for which the search engine shows an instant answer underneath a search bar, along with a list of search results. The source of data for answering conventional micro-segment questions is typically a structured database. However, the information presented in an answer to a micro-segment question is commonly limited to the content of the structured database, answer extraction code is typically hard-coded for each micro-segment, and time-sensitive information tends not to be tracked consistently.

SUMMARY

Described herein are various technologies that pertain to controlling execution of an automated search task on search results returned by a search engine. A seed query can be formed based on a user search query. The seed query can be provided to the search engine; in response to the search engine receiving the seed query, the search results returned by the search engine can be received. Moreover, an instantiation of a parameterized query for the automated search task can be executed over documents specified by the search results. The instantiation of the parameterized query can describe a linguistic pattern, a structural pattern, and a visual pattern. Responsive to execution of the instantiation of the parameterized query, a set of answer strings can be extracted from the documents. The answer strings in the set can match the linguistic pattern, the structural pattern, and the visual pattern. Further, the search engine can be controlled to provide an output in response to the user search query (e.g., to an issuer computing device). The output can be based on the set of answer strings extracted from the documents.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
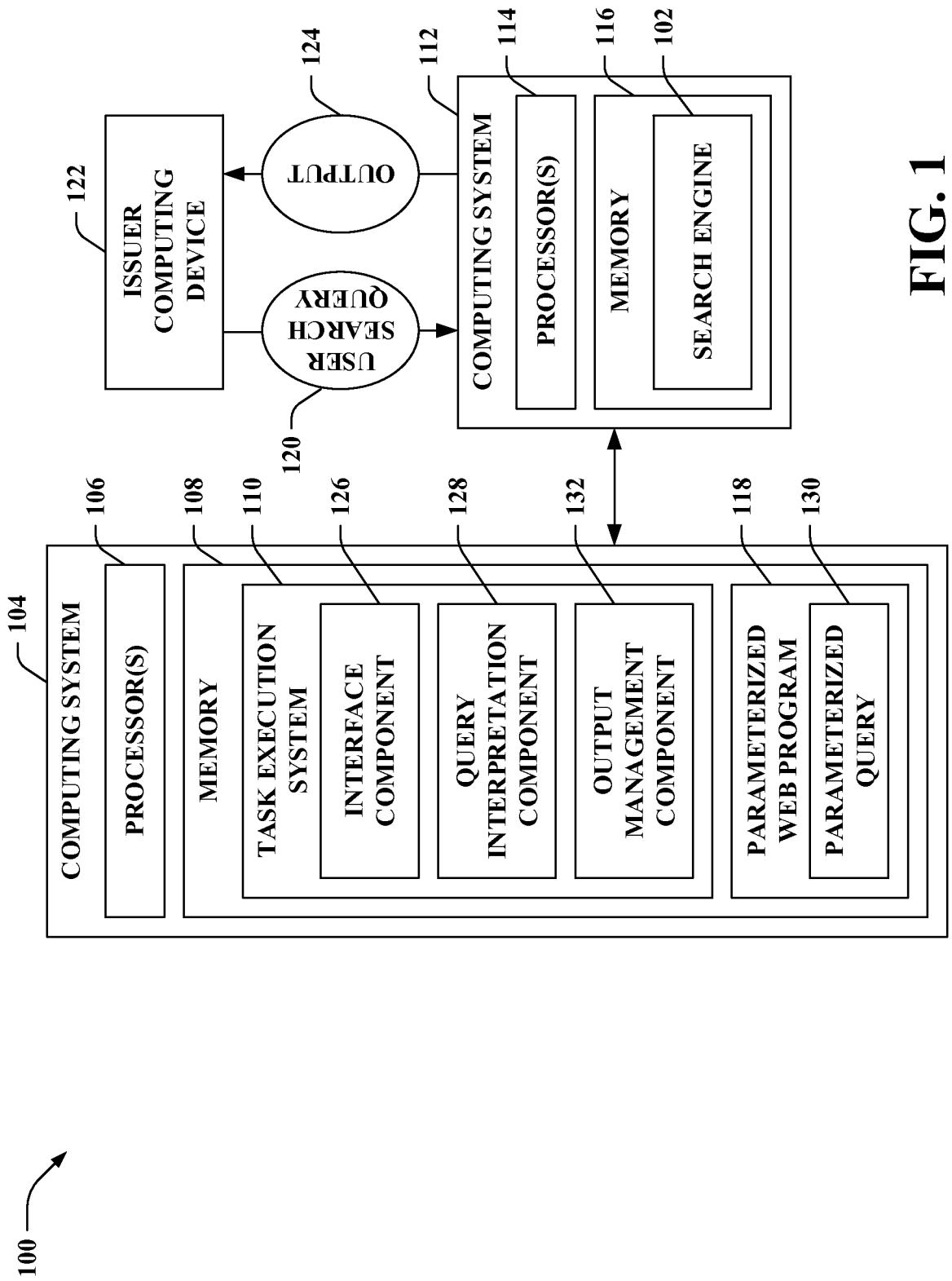
FIG. 1 illustrates a functional block diagram of an exemplary system that controls execution of an automated search task on search results returned by a search engine.

Various technologies pertaining to controlling execution of an automated search task on search results returned by a search engine are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, techniques are provided for controlling execution of an automated search task on search results returned by a search engine. A seed query can be formed based on a user search query. The seed query can be provided to the search engine; in response to the search engine receiving the seed query, the search results returned by the search engine can be received. A seed query formed based on the user search query can be used as opposed to the user search query to reduce processor load, since fewer searches may be performed to return relevant search results with high recall. Moreover, an instantiation of a parameterized query for the automated search task can be executed over documents specified by the search results. The instantiation of the parameterized query can describe a linguistic pattern, a structural pattern, and a visual pattern. Responsive to execution of the instantiation of the parameterized query, a set of answer strings can be extracted from the documents. The answer strings in the set can match the linguistic pattern, the structural pattern, and the visual pattern. Further, the search engine can be controlled to provide an output in response to the user search query (e.g., to an issuer computing device). The output can be based on the set of answer strings extracted from the documents. By providing the output based on the set of answer strings extracted from the documents, fewer user search queries may be performed to find an answer and/or fewer documents specified by search results may be accessed; thus, processor load and/or network bandwidth usage can be reduced by utilizing the techniques described herein.

A domain-specific language (DSL) is described herein for programming search strategies as part of the parameterized web program. The DSL can allow for creating a parameterized query that includes linguistic, structural, and visual expressions, which when executed respectively identify linguistic, structural, and visual patterns from a document. The DSL can be used to generate a parameterized web program that includes a parameterized query for extracting data from a document based on structure, visual layout, and linguistic patterns. Moreover, a task execution system, which can be built on a search engine, can interpret the parameterized web program. Input to the parameterized web program can include a tuple of user query arguments. The parameterized web program returns a set of answer strings. Additionally, respective confidence scores and/or source search results for the answer strings can be returned.

Execution of the parameterized web program can cause a list of search results returned by the search engine responsive to a seed query to be explored. A parameterized query can be executed over documents specified by the list of search results to extract multiple answer string representations. Further, the representations can be clustered using an application-specific similarity function. Moreover, an algorithm that ranks multiple answer strings extracted from documents is provided herein.

For example, processes for extracting answers to user search queries (e.g., "Who invented typewriter?", "List of Washington national parks", "Phone number of Costco", etc.) from the documents specified by the search results can be programmatically modeled. This modeling can enable various applications, including automating repetitive search tasks, helping search engine developers design micro-segments of factoid questions, and problem generation in language comprehension education. In contrast, existing techniques for handling repetitive types of queries often involve developing specialized algorithms to recognize and answer a certain class of queries from existing structured databases. Designing and developing such specialized algorithms for a new class of repetitive queries, however, can be time consuming and complex (e.g., relying on skill and expertise of a search engine developer, etc.). Moreover, these conventional algorithms tend to be limited to domains where data exists in a structured database.

Further, when a search engine provides an instant response, it may not be exactly what an end user wants. The end user may prefer to locate a target in iterations, by observing the context of an answer and refining a query as necessary. Multiple pages related to a desired answer may be reviewed. Moreover, there may be multiple possible "answers" to a query, and the user may be interested in exploring the context related to each of them. For this, end users may like to explore the list of search results manually, since the task of extracting and ranking multiple answer candidates along with their context lies beyond the capabilities of current micro-segment search. The foregoing can be addressed by the techniques set forth herein.

Referring now to the drawings, FIG. 1 illustrates a system 100 that controls execution of an automated search task on search results returned by a search engine 102. The system 100 includes a computing system 104. The computing system 104 includes at least one processor 106 and memory 108. The processor 106 is configured to execute instructions loaded into the memory 108 (e.g., one or more systems loaded into the memory 108, one or more components loaded into the memory 108, etc.). As described in greater detail herein, the memory 108 includes a task execution system 110 that controls the execution of the automated search task on the search results returned by the search engine 102. The task execution system 110 is executable by the processor 106.

In the example set forth in FIG. 1, the computing system 104 can be or include one or more server computing devices. For instance, the computing system 104 can be or include one or more datacenters, where a datacenter includes a plurality of server computing devices. One or more datacenters can alternatively include the computing system 104. Further, the computing system 104 can be a distributed computing system.

Figure 3:
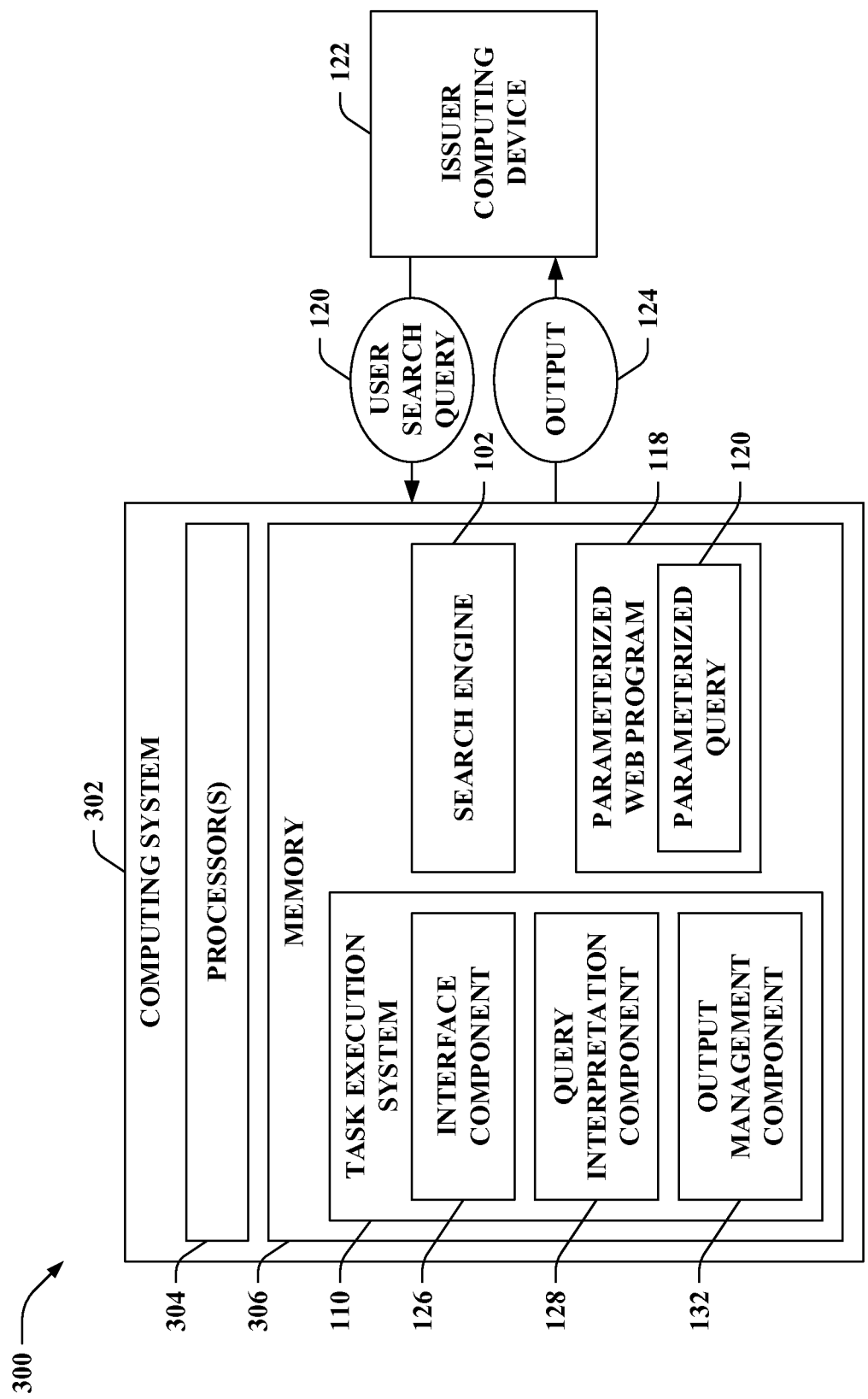
FIG. 3 illustrates a functional block diagram of another exemplary system that controls execution of an automated search task on search results returned by the search engine.

As depicted in FIG. 1, the system 100 further includes a computing system 112. Similar to the computing system 104, the computing system 112 includes at least one processor 114 and memory 116. The memory 116 includes the search engine 102, which is executable by the processor 114. While FIG. 1 shows separate computing systems 104 and 112 including the task execution system 110 and the search engine 102, respectively, it is to be appreciated that a common computing system can include both the task execution system 110 and the search engine 102 (e.g., as depicted in FIG. 3).

The task execution system 110 executes an instantiation of a parameterized web program 118. The instantiation of the parameterized web program 118 can be loaded in the memory 108. The parameterized web program 118 is configured for the automated search task. Further, instantiations of differing parameterized web programs can be executed by the task execution system 110 for differing types of automated search tasks. Thus, the task execution system 110 can cause an instantiation of a particular parameterized web program (e.g., the parameterized web program 118, a differing parameterized web program, etc.) to be loaded into the memory 108 based upon a type of automated search task to be performed. For instance, the type of automated search task can be detected (e.g., by the search engine 102, by the task execution system 110) based on a user search query 120; yet, the claimed subject matter is not so limited.

The search engine 102 can receive the user search query 120 from an issuer computing device 122. Moreover, the search engine 102 can provide an output 124 to the issuer computing device 122 in response to the user search query 120. The output 124 provided by the search engine 102 to the issuer computing device 122 can be controlled by the task execution system 110. The issuer computing device 122 can be substantially any type of computing device. Examples of the issuer computing device 122 include a desktop computing device, a mobile computing device (e.g., a laptop computing device, a mobile telephone, a tablet computing device, a wearable computing device, a handheld computing device, a portable gaming device, a personal digital assistant, etc.), a gaming console, a set-top box, a television, an embedded computing device, or the like.

The task execution system 110 includes an interface component 126 that receives search results returned by the search engine 102. The search engine 102 can return the search results responsive to receiving a seed query. Further, the seed query can be formed based on the user search query 120 from the issuer computing device 122. According to an example, the interface component 126 can receive the user search query 120 from the search engine 102, and the task execution system 110 can form the seed query based on the user search query 120. Following this example, the interface component 126 can input the seed query to the search engine 102; responsive to inputting the seed query, the interface component 126 can receive the search results from the search engine 102. Use of the seed query formed based on the user search query 120 can reduce processor load in comparison to a technique that does not use such seed query, since fewer searches may be performed by the search engine 102 to return relevant search results with high recall.

The task execution system 110 further includes a query interpretation component 128 that executes an instantiation of a parameterized query 130 for the automated search task over documents specified by the search results received by the interface component 126 from the search engine 102. The parameterized web program 118 includes the parameterized query 130. The instantiation of the parameterized query 130 can describe one or more linguistic patterns, one or more structural patterns, and/or one or more visual patterns. Responsive to execution of the instantiation of the parameterized query, the query interpretation component 128 extracts a set of answer strings from the documents. The answer strings in the set match the patterns described by the parameterized query 130. The query interpretation component 128 can use natural language processing (NLP) algorithms, semi-structured content of documents, Cascading Style Sheets (CSS) attributes of HyperText Markup Language (HTML) nodes, and so forth to execute the instantiation of the parameterized query 130. According to an example, the query interpretation component 128 can employ logical table parsing based on features (e.g., textual, structural, visual features) of the documents to extract structural information from semi-structured data of the documents.

Moreover, the task execution system 110 includes an output management component 132 that controls the output 124 provided in response to the user search query 120. The output management component 132 controls the output 124 based on the set of answer strings extracted from the documents. As shown in the example set forth in FIG. 1, the output management component 132 controls the search engine 102 to provide the output 124 in response to the user search query 120 based on the set of answer strings extracted from the documents. By providing the output 124 based on the set of answer strings extracted from the documents, fewer user search queries may be performed to find an answer and/or fewer documents specified by search results may be accessed by the issuer computing device 122; the foregoing can result in reducing processor load and reducing network bandwidth usage.

The parameterized web program 118 is configured to be executed by the task execution system 110 to perform the automated search task, which can be a repetitive type of search task. The parameterized web program 118 is programmed using a domain-specific language (DSL). Features of a search strategy can be programmed using the DSL as part of the parameterized web program 118; thus, the search strategy can be automated by the parameterized web program 118. For instance, the parameterized query 130 created using the DSL can include linguistic, structural, and visual expressions, which respectively identify linguistic, structural, and visual patterns from documents when executed by the query interpretation component 128. Thus, the DSL can be used to create the parameterized web program 118 that includes the parameterized query 130 for extracting data from a document specified by a search result, where the data is extracted based on structure, visual layout, and linguistic patterns.

Development of the parameterized web program 118 may involve multiple iterations to ensure both high precision and recall. Further, execution of parameterized web programs by the task execution system 110 can enable the search engine 102 to return respective outputs responsive to user search queries. Such outputs returned by the search engine 102 responsive to the user search queries can have improved percentages of correct answers for the queries (thereby reducing processor load and/or network bandwidth usage) as compared to conventional techniques.

Parameterized web programs can be developed for various applications. Examples of such applications include factoid micro-segments, repeatable search tasks, and problem generation. However, it is contemplated that other applications are intended to fall within the scope of the hereto appended claims.

According to an example, the parameterized web program 118 can be manually programmed. By way of another example, NLP technologies for user intent understanding can be employed as part of construction of the parameterized web program 118. Additionally or alternatively, synthesis of the parameterized web program 118 can be from examples (e.g., programming-by-example).

Pursuant to an example, the system 100 can be employed for factoid micro-segments. Following this example, the user search query 120 received by the search engine 102 from the issuer computing device 122 can be evaluated to determine whether it belongs to a given micro-segment of queries (e.g., for a particular type of factoid); further, the parameterized query 130 (and the parameterized web program 118 in general) can be predefined for the given micro-segment of queries. Responsive to the user search query 120 being identified as belonging to the given micro-segment of queries, a seed query for the micro-segment of queries can be formed based on the user search query 120, and the interface component 126 can input the seed query to the search engine 102. Further, the interface component 126 can receive the search results from the search engine 102, the query interpretation component 128 can execute the instantiation of the parameterized query 130 for the automated search task over documents specified by the search results to extract the set of answer strings, and the output management component 132 can control the output 124 based on the set of answer strings. Thus, the parameterized web program 118 developed for the given micro-segment of queries can be executed by the task execution system 110 (e.g., as part of a question answering module for the search engine 102) based on the user search query 120 in response to the user search query 120 being identified as belonging to the given micro-segment of queries.

Figure 2:
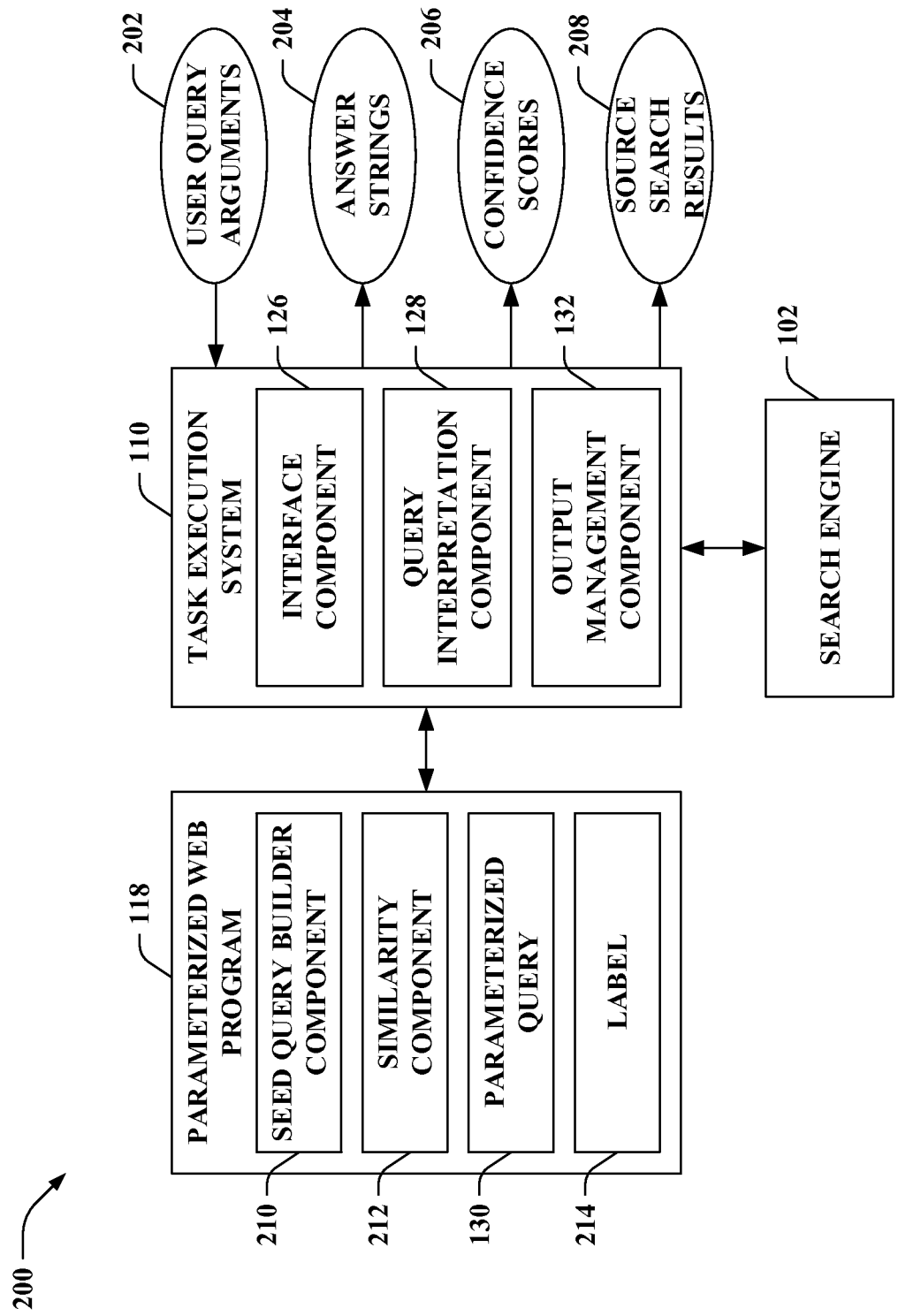
FIG. 2 illustrates a functional block diagram of an exemplary system that performs an automated search task.

Turning to FIG. 2, illustrated is a system 200 that performs an automated search task. The system 200 includes the search engine 102, the task execution system 110, and the parameterized web program 118. A tuple of user query arguments 202 ($\vec{v}$) is inputted to the task execution system 110. For example, the user query arguments 202 can be or include the user search query 120 received by the search engine 102. Responsive to execution of the instantiation of the parameterized web program 118 based on the tuple of user query arguments 202, the task execution system 110 returns a set of answer strings 204 from documents specified by search results returned by the search engine 102. The task execution system 110 can also return respective confidence scores 206 (e.g., relevance scores) for the answer strings 204 in the set. Moreover, the task execution system 110 can return respective source search results 208 (e.g., source uniform resource locators (URLs)) for the answer strings 204 in the set (e.g., a source search result for an answer string specifies a document from which the answer strings is extracted).

The parameterized web program 118 can be used for repetitive search tasks. A substantially similar strategy can be used for a series of similar search tasks with different parameters (e.g., differing user query arguments). An illustration of a repetitive search task is an end user finding respective phone numbers of multiple people in a list. Another illustration of a repetitive search task is a category of search tasks that provides answers to a type of question (e.g., "Who is the inventor of _____?", "Find the nearest _____", etc.), where information for the answers is available on the Web (e.g., a parameterized search task for a category can be defined once by a developer and executed multiple times with different user query arguments). Thus, the parameterized web program 118 can be defined as a function from strings to sets of strings for the similar search tasks. Further, the execution of such function can be performed over data on the Web, and the function can include patterns that constitute an automated search strategy. Accordingly, the parameterized web program 118 can be defined and later executed multiple times for various specific arguments.

A given search task can have multiple answers. Depending on the nature of the search task, there may be multiple pieces of information that can be extracted from a document as a possible answer. Accordingly, it may be desirable to compare possible answers by a measure of the respective confidence scores 206 and/or explore context related to any of the possible answers.

The parameterized web program 118 includes the parameterized query 130 ($Q$). Moreover, the parameterized web program 118 includes a seed query builder component 210 (q), a similarity component 212 ($\sigma$), and a label 214 ($l_a$). Thus, a parameterized web program $\mathcal{P}$ (e.g., the parameterized web program 118) is defined as a tuple $\langle q, \sigma, Q, l_a \rangle$.

The seed query builder component 210 (q) forms a seed query for the search engine 102. The seed query builder component 210 builds the seed query based on the user query arguments 202 (e.g., the user search query 120). The seed query formed by the seed query builder component 210 can be likely to return a set of relevant search results with high recall in response to being inputted to the search engine 102. Thus, as part of execution of instantiation of the parameterized web program 118 by the task execution system 110, the seed query can be formed by the seed query builder component 210 and the seed query can be inputted to the search engine 102. Further, search results returned by the search engine 102 responsive to the seed query can be explored.

The seed query builder component 210 composes the seed query for the search engine 102. The seed query yields a set of search results with high recall, but possibly low precision. For instance, a combination of arguments (e.g., the user query arguments 202) may not constitute a good initial query for the search engine 102; based on the application, the seed query builder component 210 can use additional keywords and/or other features of a front-end of the search engine 102 for the seed query. Accordingly, the seed query builder component 210 can enable the search engine 102 to return a list of relevant search results, and documents specified by the search results can be explored. Multiple documents can be explored, since multiple "correct" answers to a question may exist, thereby enabling confidence scores for differing answer strings to be computed.

Further, the similarity component 212 ($\sigma$) clusters answer strings based on an application-specific similarity function. The similarity component 212 compares two answer strings from one or more documents specified by the search results. The similarity component 212 determines whether the answer strings describe the same "answer", according to the application-specific similarity function.

Answers can have multiple representations. For instance, a single answer can be found on the Web in multiple string representations. By way of illustration, a person's name can be written with or without middle initial (e.g., 'Joe X. Smith' versus 'Joe Smith'), with given name or family name first (e.g., 'Joe Smith' versus 'Smith, Joe'), with or without proper capitalization (e.g., 'joe smith' versus 'Joe Smith'), with or without abbreviations (e.g., 'J. Smith' versus 'Joe Smith'), and so forth. To account for the multiple representations, the similarity component 212 can cluster together multiple representations of the same answer using the application-specific similarity function, which defines application-specific logic of answer similarity. Moreover, the resulting clusters can be ranked by a measure of answer confidence, and a representative answer string for each cluster can be chosen.

The parameterized query 130 ($\mathcal{Q}$) describes a set of patterns used to find information from the documents specified by the search results. The parameterized query 130 is parameterized by the tuple of user query arguments $\vec{v}$ (e.g., the user query arguments 202) at runtime for each search invocation. The query interpretation component 128 executes the instantiation of the parameterized query 130 on each document specified by the search results returned by the search engine 102 to extract a set of answer strings. As a result of execution by the query interpretation component 128, the parameterized query 130 matches none, one, or many answer strings on the document(s).

When executing the instantiation of the parameterized query 130 over documents to detect answer strings, various types of patterns can be used to locate relevant information within contents of the documents. The patterns can be categorized as linguistic patterns, structural patterns, and visual patterns.

Linguistic patterns can include semantic information, sentence structure, and textual content of a document. For instance, linguistic patterns can use sentence structure to find semantic patterns within the content of a document. On the lowest level, an answer is typically a piece of text that is surrounded by sentences whose structure can be fuzzily described using semantic and linguistic terminology.

Structural patterns use structured or semi-structured content of a document to extract information according to an implicit schema. Much of the text content on the Web is not structured, but rather semi-structured. For example, tables oftentimes are not normalized, and commonly not marked as a table. For instance, the following may be identified as a logical table (e.g., an implicit table): HTML <table>, <ul>, or <ol>; plain text with separators; and block elements, spatially aligned in a table-like structure. Moreover, it is contemplated that structural patterns can use relational information of a document.

Visual patterns use spatial layout of a document, colors, proximity emphasis, presentational attributes of elements, and other stylistic features to locate relevant information. The exact instantiation of these patterns (e.g., specific colors or layout) can differ among documents.

The label 214 ($l_a$) specifies a subexpression of a match for the parameterized query 130 that is to be extracted as an "answer". Semantics of the label 214 can be similar to named capturing groups in regular expressions.

The parameterized web program 118 ($\mathcal{P}$) takes a tuple of user query arguments $\vec{v}$ (e.g., the user query arguments 202) and can return the set of answer strings 204, annotated with respective confidence scores 206 along with corresponding source search results 208 (e.g., source URLs). Execution of the parameterized web program 118 ($\mathcal{P}$) on the tuple of user query arguments $\vec{v}$ is defined as $\mathcal{P}:\vec{v} \rightarrow \{\langle \alpha_i, \beta_i, U_i \rangle\}$, where $\alpha_i$ is the $i^{th}$ answer string, $\beta_i$ is its confidence score, and $U_i$ is the set of its source URLs. Higher confidence scores correspond to more relevant answers.

During execution by the task execution system 110, the seed query builder component 210 of the parameterized web program 118 ($\mathcal{P}$) constructs the seed query for the search engine 102. The search engine 102 can perform a search over unstructured or semi-structured Web data; responsive to performance of the search, the search engine 102 can return a list of search results. The semi-structured Web data, for instance, can be partially labeled to be accessible and recognizable by humans, yet not by conventional data collection algorithms. The query interpretation component 128 can execute the instantiation of the parameterized query 130 over documents specified by the returned search results in the list and extract answer strings based on matches to pattern(s) described in the parameterized query 130. Further, the similarity component 212 can cluster the answer strings according to the application-specific similarity function.

Now referring to FIG. 3, illustrated is another system 300 that controls execution of an automated search task on search results returned by the search engine 102. The system 300 includes a computing system 302. The computing system 302 includes at least one processor 304 and memory 306. In the example shown in FIG. 3, the memory 306 includes the search engine 102 and the task execution system 110, which are executable by the processor 304. Thus, the computing system 302 includes both the search engine 102 and the task execution system 110. According to an example (not shown), it is contemplated that the search engine 102 can include the task execution system 110 (or a portion thereof). Moreover, the memory 306 can include the parameterized web program 118. Again, it is to be appreciated that the search engine 102 can include the parameterized web program 118 (or a portion thereof), for example.

The computing system 302 can be substantially similar to the computing system 104 or the computing system 112 of FIG. 1. The computing system 302 can be or include one or more server computing devices. According to various examples, the computing system 302 can be or include one or more datacenters, or one or more datacenters can include the computing system 302. Additionally or alternatively, the computing system 302 can be a distributed computing system.

Similar to the example set forth in FIG. 1, the search engine 102 can receive the user search query 120 from the issuer computing device 122. A seed query can be formed based on the user search query 120 (e.g., by the seed query builder component 210 of the parameterized web program 118), and the seed query can be inputted to the search engine 102 (e.g., by the interface component 126). Moreover, the interface component 126 can receive search results returned by the search engine 102 responsive to the search engine 102 receiving the seed query. The query interpretation component 128 can execute an instantiation of the parameterized query 130 over documents specified by the search results. Responsive to execution of the instantiation of the parameterized query 130, the query interpretation component 128 can extract a set of answer strings from the documents. Further, the output management component 132 can control the search engine 102 to provide the output 124 in response to the user search query 120 to the issuer computing device 122. The output management component 132 can control the output based on the set of answer strings extracted from the documents.

FIGS. 1 and 3 are now both referenced. As described herein, the query interpretation component 128 extracts the set of answer strings from the documents specified by the search results. Moreover, the task execution system 110 can compute respective confidence scores for the answer strings in the set. Further, the task execution system 110 can identify respective source search results for the answer strings in the set. Below are various exemplary outputs (e.g., the output 124) that can be controlled by the output management component 132 based on the set of answer strings extracted from the documents, where such outputs can be provided by the search engine 102 to the issuer computing device 122.

According to an example, the output management component 132 can select a particular answer string from the set of answer strings extracted from the documents. For instance, the output management component 132 can select the particular answer string from the set of answer strings based on the respective confidence scores for the answer strings in the set (e.g., the output management component 132 can select the particular answer string having a highest corresponding confidence score, etc.). Further, the output management component 132 can control the search engine 102 to provide the particular answer string to the issuer computing device 122 for presentation in response to the user search query 120. By way of illustration, the issuer computing device 122 can display the particular answer string underneath a search bar on a display screen (e.g., the user search query 120 may have been entered in the search bar). The confidence score of the particular answer string and/or the source search result of the particular answer string can also be displayed on the display screen by the issuer computing device 122; yet, the claimed subject matter is not so limited. Following the foregoing illustration, the search results may also be displayed on the display screen by the issuer computing device 122; the search results, for instance, may be displayed below the particular answer string on the display screen. However, in accordance with another illustration, the issuer computing device 122 can display the particular answer string on the display screen without displaying the search results.

In accordance with another example, the output management component 132 can control the search engine 102 to provide the set of answer strings extracted from the documents, the respective source search results for the answer strings in the set, and the respective confidence scores for the answer strings in the set to the issuer computing device 122 in response to the user search query 120. The issuer computing device 122, for instance, can display the set of answer strings, the respective source search results for the answer strings, and/or the respective confidence scores for the answer strings on the display screen. Moreover, it is contemplated that other search results (e.g., from the search results returned by the search engine 102 responsive to the seed query) may or may not be displayed by the issuer computing device 122 on the display screen.

Pursuant to another example, the output management component 132 can cause the search engine 102 to rank the search results based on the set of answer strings extracted from the documents, the respective source search results for the answer strings in the set, and the respective confidence scores for the answer strings in the set. The output management component 132 can further control the search engine 102 to provide the search results as ranked to the issuer computing device 122 for presentation in response to the user search query 120. Thus, the issuer computing device 122 can display the search results as ranked on the display screen.

According to yet another further example, the task execution system 110 can extract a particular answer string from a document and content around the particular answer string from the document (e.g., a snippet), where the set of answer strings includes the particular answer string. The output management component 132 can control the search engine 102 to provide the particular answer string and the content around the particular answer string to the issuer computing device 122 for presentation in response to the user search query 120. The issuer computing device 122, for instance, can display the particular answer string and the content around the answer string on the display screen.

The system 100 of FIG. 1 and the system 300 of FIG. 3 can perform a micro-segment search over Web data, for example. According to an illustration, a segment developer can construct the parameterized web program 118 (e.g., including the parameterized query 130) for the given micro-segment. By way of example, the user search query 120 can belong to the given micro-segment for which the parameterized web program 118 was constructed. For instance, the search engine 102 can detect that the user search query 120 belongs to the given micro-segment. Further, the search engine 102 can provide the user search query 120 and retrieved search results (e.g., returned responsive to the seed query formed based on the user search query 120) to the interface component 126.

The task execution system 110 can extract parameters for the parameterized web program 118 (which are passed down to the parameterized query 130) from the user search query 120. The task execution system 110 can execute an instantiation of the parameterized query 130 against documents specified by the search results received from the search engine 102 responsive to the user search query 120. The query interpretation component 128 can extract spatial, linguistic, and textual features from the documents. The task execution system 110 can return a ranked list of weighted answers along with the context (e.g., source search result) in which such answers occur to the search engine 102. Further, the search engine 102 can return the weighted answers (or a portion thereof) and the corresponding contexts as at least part of the output 124. For instance, content around an answer can be extracted and used as a focused snippet, highlighted in a snippet, etc. Moreover, the output 124 can include the set of webpages/URLs. For instance, the weighted answers can be displayed along with the set of webpages/URLs.

According to an example, the search engine 102 can also identify whether the user search query 120 belongs to a micro-segment that is coded to find data in a structured database. Thus, if the user search query 120 is detected to correspond to such micro-segment, then the data can be retrieved from the structured database. Following this example, the search engine 102 can determine whether the user search query 120 belongs to a particular micro-segment coded to obtain data from semi-structured Web data (e.g., utilizing the parameterized web program 118), a particular micro-segment coded to obtain data from a structured database, or none of the micro-segments.

Figure 4:
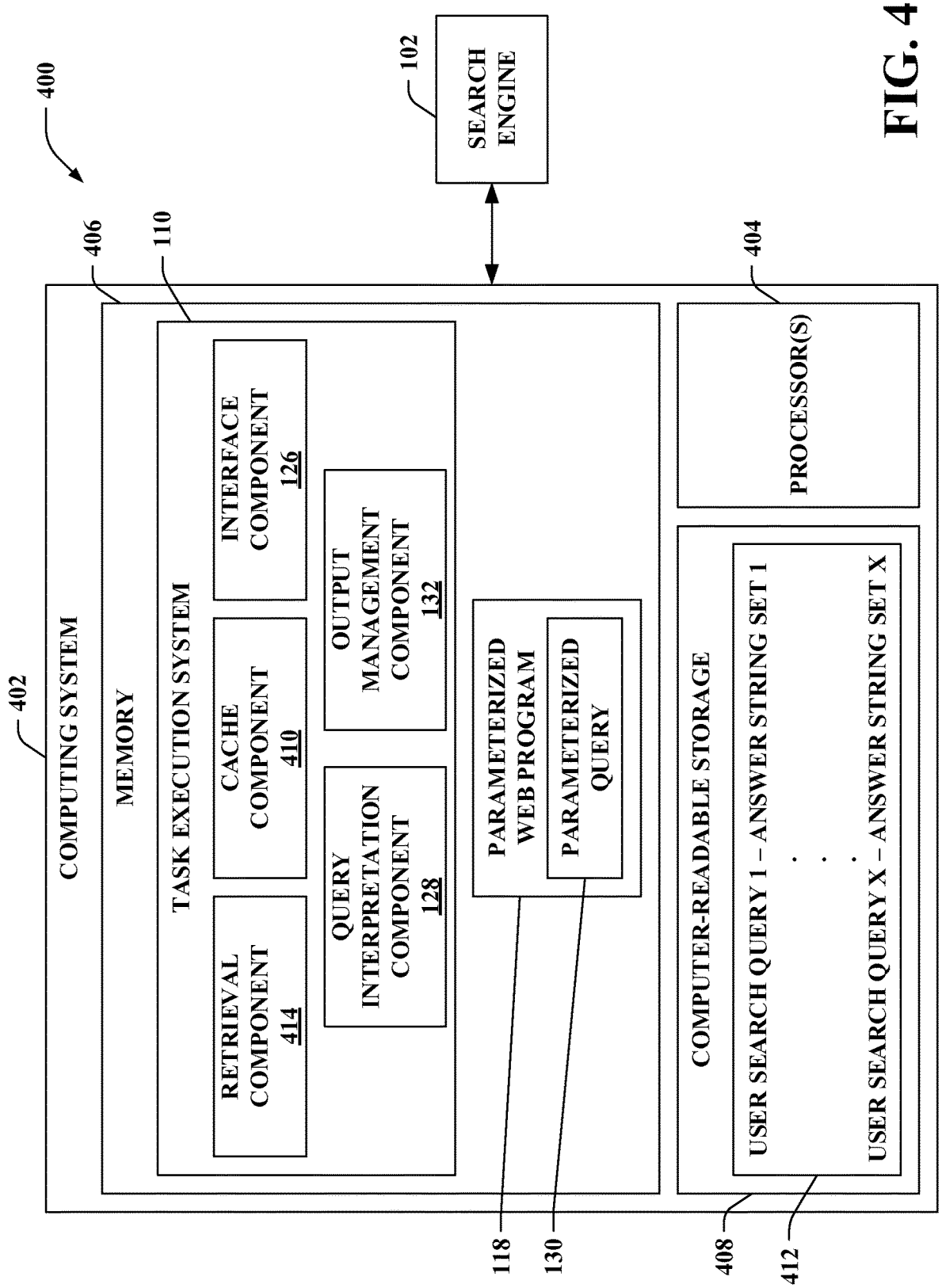
FIG. 4 illustrates a functional block diagram of an exemplary system that caches answer string sets extracted from documents as part of automated search tasks executed on search results.

Turning to FIG. 4, illustrated is a system 400 that caches answer string sets extracted from documents as part of automated search tasks executed on search results. The system 400 includes a computing system 402. The computing system 402 can be the computing system 104 of FIG. 1 or the computing system 302 of FIG. 3. The computing system 402 includes one or more processors 404, memory 406, and computer-readable storage 408. The computer-readable storage 408, for instance, can include the memory 406. The memory 406 includes the task execution system 110 and the parameterized web program 118.

The system 400 further includes the search engine 102. According to an example (similar to FIG. 1), a computing system separate from the computing system 402 can include the search engine 102. By way of another example (similar to FIG. 3), the computing system 402 can include the search engine 102.

Similar to above, the interface component 126 receives search results returned by the search engine 102 responsive to the search engine 102 receiving the seed query, where the seed query is formed based on a user search query. Moreover, the query interpretation component 128 executes an instantiation of the parameterized query 130 over documents specified by the search results, and extracts a set of answer strings from the documents.

The task execution system 110 can further include a cache component 410 that stores the user search query and the set of answer strings in the computer-readable storage 408 as part of a log 412 (e.g., the user search query and the set of answer strings can be stored as user search query X and answer string set X in the log 412, where a value of X can be substantially any integer). Moreover, although not shown, it is contemplated that the cache component 410 can additionally store the confidence scores and/or the source search results corresponding to the answer strings in the computer-readable store 408 as part of the log 412.

According to an example, the task execution system 110 can track a duration of time of the execution of the instantiation of the parameterized query 130. Prior to completion of the execution of the instantiation of the parameterized query 130 and responsive to the duration of time of the execution of the instantiation of the parameterized query 130 exceeding a threshold time duration, the output management component 132 can control the search engine 102 to provide the search results to an issuer computing device (e.g., the issuer computing device 122) from which the user search query was received. Moreover, the query interpretation component 128 can continue the execution of the parameterized query 130 to completion to extract the set of answer strings from the documents when the duration of time exceeds the threshold time duration. Thereafter, when the execution completes, the cache component 410 can store the user search query and the set of answer strings in the computer-readable storage 408 as part of the log 412.

Alternatively, when the duration of the execution of the instantiation of the parameterized query 130 is less than or equal to the threshold duration and responsive to the completion of the execution of the instantiation of the parameterized query 130, the output management component 132 can control the search engine 102 to provide the output based on the set of answer strings extracted from the documents to the issuer computing device for presentation in response to the user search query. Again, the cache component 410 can store the user search query and the set of answer strings in the computer-readable storage 408 as part of the log 412 responsive to the completion of the execution of the instantiation of the parameterized query 130.

Data stored in the log 412 can be retrieved and used for subsequent user search queries (e.g., if a user search query is subsequently rerun). The task execution system 110 can further include a retrieval component 414. Responsive to the search engine 102 receiving a user search query, the retrieval component 414 can check whether such user search query and corresponding answer string set is retained in the log 412. If the retrieval component 414 identifies that the log 412 includes the user search query and corresponding answer string set (e.g., the user search query is a subsequent instance of the user search query X), then the retrieval component 414 can retrieve the corresponding set of answer strings (e.g., the answer string set X) from the computer-readable storage 408. In such case, the query interpretation component 128 need not execute an instantiation of the parameterized query 130, thereby reducing load on the processor(s) 404. Further, the output management component 132 can control the search engine 102 to provide an output (e.g., in response to the subsequent instance of the user search query X) based on the set of answer strings retrieved by the retrieval component 414 from the computer-readable storage 408.

Figure 5:
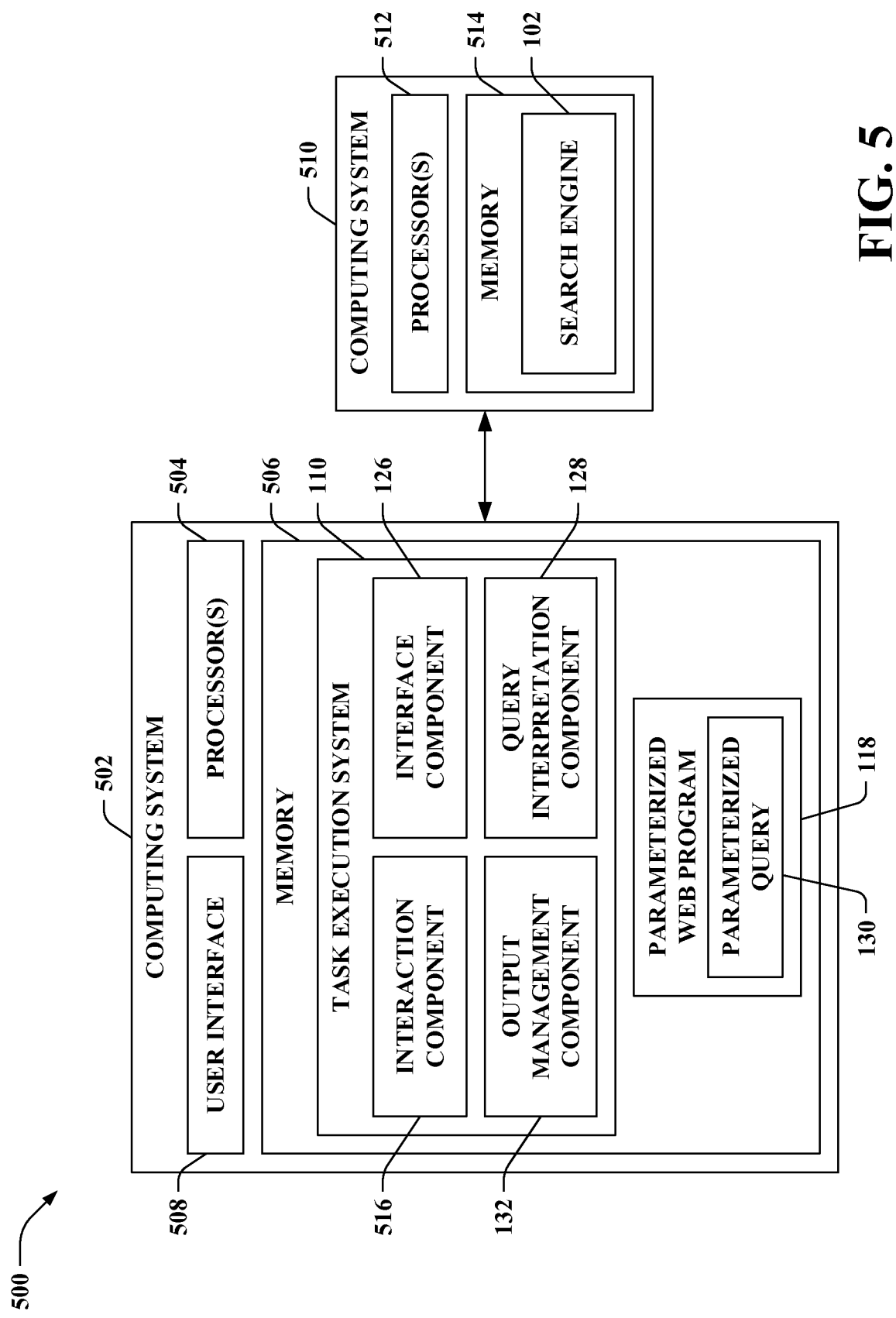
FIG. 5 illustrates a functional block diagram of another exemplary system that controls execution of an automated search task on search results returned by the search engine.

Turning to FIG. 5, illustrated is another system 500 that controls execution of an automated search task on search results returned by the search engine 102. The system 500 includes a computing system 502, which includes at least one processor 504 and memory 506. Moreover, the computing system 502 includes a user interface 508. The memory 506 includes the task execution system 110 and the parameterized web program 118.

The system 500 also includes a computing system 510 (e.g., the computing system 112 of FIG. 1). The computing system 510 includes one or more processors 512 and memory 514. Further, the memory 514 includes the search engine 102.

The computing system 502 can be or include substantially any type of computing device. For example, the computing system 502 can be or include a desktop computing device, a mobile computing device (e.g., a laptop computing device, a mobile telephone, a tablet computing device, a wearable computing device, a handheld computing device, a portable gaming device, a personal digital assistant, etc.), a gaming console, a set-top box, a television, an embedded computing device, or the like. According to an illustration, the computing system 502 can be or include the issuer computing device 122 described herein.

In the example depicted in FIG. 5, the task execution system 110 includes an interaction component 516 that receives a user search query (e.g., from a user of the computing system 502) via the user interface 508. A seed query can be formed based on the user search query received by the interaction component 516 (e.g., by the seed query builder component 210 of the parameterized web program 118). Further, the interface component 126 can input the seed query to the search engine 102. The interface component 126 can further receive search results returned by the search engine 102 responsive to the search engine 102 receiving the seed query. Moreover, the query interpretation component 128 can execute an instantiation of the parameterized query 130 over documents specified by the search results and extract a set of answer strings from the documents in response to the execution of the instantiation of the parameterized query 130. The output management component 132 can control an output provided in response to the user search query based on the set of answer strings extracted from the documents. The interaction component 516 can provide the output as controlled by the output management component 132 in response to the user search query via the user interface 508.

Figure 6:
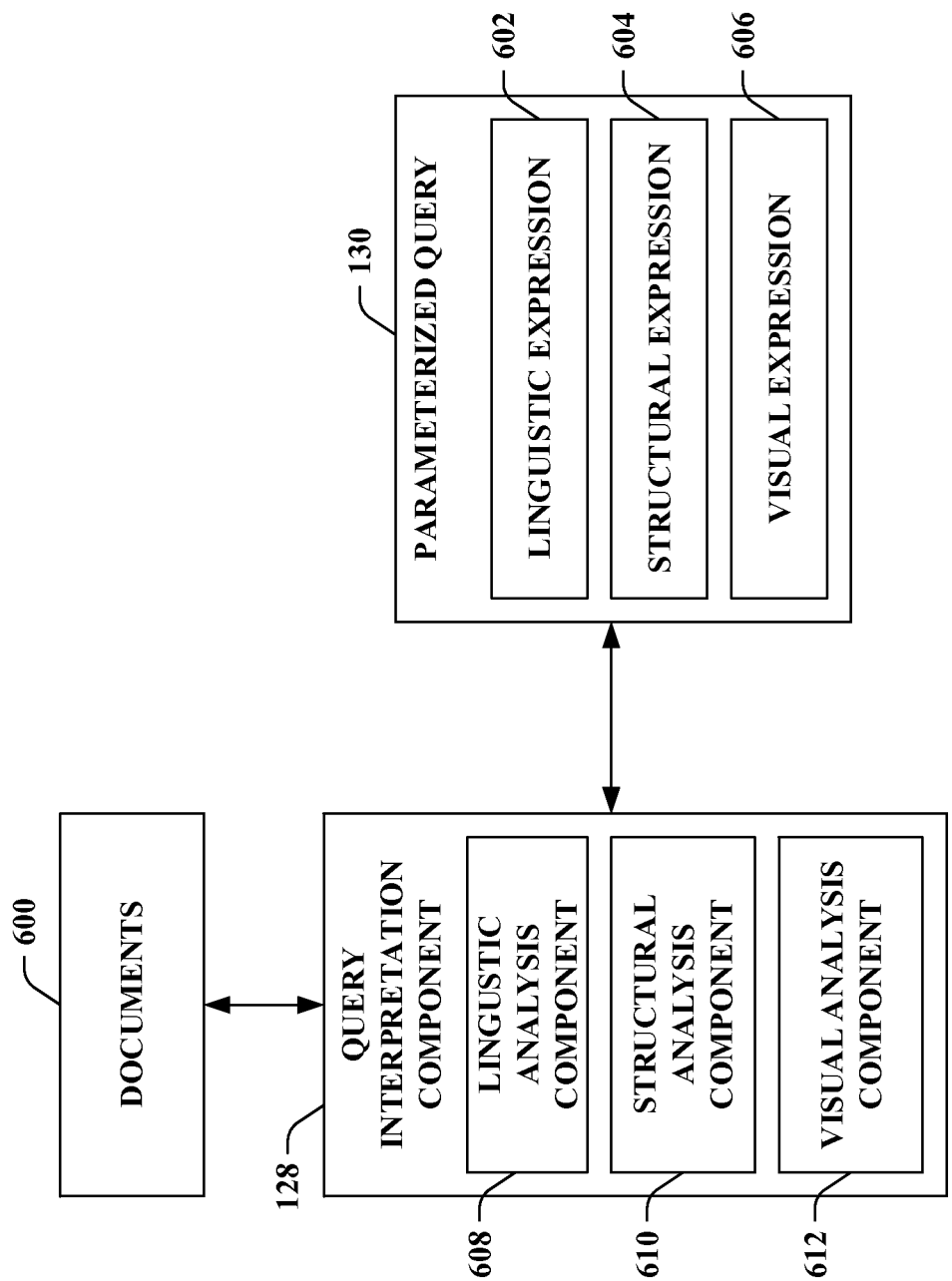
FIG. 6 illustrates an query interpretation component of a system that controls execution of an automated search task in greater detail.

FIG. 6 illustrates the query interpretation component 128 in greater detail. The query interpretation component 128 executes an instantiation of the parameterized query 130 against one or more documents 600. The documents 600 can be specified by a search result returned by the search engine 102.

The parameterized query 130 describes a set of patterns used to locate relevant information within content of the documents 600. More particularly, the parameterized query 130 can include a linguistic expression 602 that describes a linguistic pattern, a structural expression 604 that describes a structural pattern, and a visual expression 606 that describes a visual pattern. The linguistic expression 602, the structural expression 604, and the visual expression 606 are predefined in the DSL described herein. While not shown, it is contemplated that the parameterized query 130 can include more than one linguistic expression, more than one structural expression, and/or more than one visual pattern. Further, according to other examples, the parameterized query 130 may lack the linguistic expression 602, the structural expression 604, the visual expression 606, or two of the foregoing types of expressions.

The query interpretation component 128 can execute the parameterized query 130 against the documents 600 received from the search engine. Moreover, the query interpretation component 128 includes a linguistic analysis component 608, a structural analysis component 610, and a visual analysis component 612. The linguistic analysis component 608, the structural analysis component 610, and the visual analysis component 612 can respectively interpret the linguistic expression 602, the structural expression 604, and the visual expression 606 of the parameterized query 130.

The structural analysis component 610 can create a logical table based on features detected from semi-structured data of a particular document (e.g., one of the documents 600). According to an example, the structural analysis component 610 can create the logical table based on detected grid alignment of bounding boxes of nodes included in the particular document. Pursuant to another example, the structural analysis component 610 can create the logical table based on tags included in the particular document. By way of yet another example, the structural analysis component 610 can create the logical table based on plain text separators included in the particular document. Further, the structural analysis component 610 can execute a relational operation over the logical table to return an answer string that matches the structural pattern described by the structural expression 604.

Moreover, it is contemplated that the DSL used to create the parameterized web program 118 (e.g., the parameterized query 130) can be extensible; thus, additional types of expressions can be added to the DSL and used for creation of parameterized queries. Accordingly, the linguistic analysis component 608, the structural analysis component 610, and the visual analysis component 612 that interpret the different parts of the parameterized query 130 can be replaceable. By way of illustration, the linguistic analysis component 608 can be replaced with an updated linguistic analysis component, which can interpret an updated set of linguistic expressions that are part of the DSL.

The parameterized query 130 (e.g., a parameterized query $\mathcal{Q}$) is now described in greater detail. A parameterized query $\mathcal{Q}$ can be executed against a webpage (e.g., one of the documents 600). A webpage is a tree of HTML nodes $\mathcal{N}$. For each HTML node $\mathcal{N}$, two auxiliary functions BBox($\mathcal{N}$) and Text($\mathcal{N}$) can be defined; these auxiliary functions can be used to determine the result of the execution. BBox($\mathcal{N}$) returns a rectangle b that is the smallest bounding box of node $\mathcal{N}$ on the page, when rendered by a browser (assuming a fixed resolution). Text($\mathcal{N}$) returns a string that includes displayed textual content of $\mathcal{N}$, with HTML tags stripped off. The result of executing the parameterized query $\mathcal{Q}$ against such a webpage is a multi-set of possible answer strings, each labeled with some label l—the subexpression of $\mathcal{Q}$ that matched this answer string. A subset of this multi-set that is labeled with the "answer label" $1_a$ in the definition of $\mathcal{P}$ is selected for the final answer set.

Exemplary language syntax for parameterized queries is shown below. In the following, $v_k$ denotes the $k^{th}$ argument in a tuple of user query arguments f), k denotes an integer constant, and w denotes a string constant.

Linguistic pattern $\in := \in^+ | \in^* | \in ? | \in_1 \in_2 | l : \in | Word | ConstWord(s) | ConstPhrase(s_1, \ldots, s_k) | Syn(s) | POS(p) | Entity(e) | NP | \ldots$ Linguistic constraint $\Phi := SameSentence(l_1, l_2) | Regex(l, s) | \ldots | \Phi_1 \wedge \Phi_2 | \Phi_1 \vee \Phi_2 | \neg \Phi | true | false$
Linguistic expression $\mathcal{L} := Ling(\in, \Phi) | \mathcal{L}_1 \vee \mathcal{L}_2$
String $s := w | v_k$
ID labels $l, \eta := w$
Part of speech $p \in \{Noun, Verb, Prep, \ldots\}$
Entity type $e \in \{Person, Org, \ldots\}$
Parameterized query $\mathcal{Q} := FW(\mathcal{B}, \Psi) | \mathcal{Q}_1 \vee \mathcal{Q}_2$
Visual expression $\mathcal{B} := \mathcal{S} | Union(\mathcal{B}_1, \mathcal{B}_2) | \eta : \mathcal{B}$
Visual constraint $\Psi := Nearby(\eta_1, \eta_2) | Emphasized(\eta) | Layout(\eta_1, \eta_2, d) | \ldots | \Psi_1 \wedge \Psi_2 | \Psi_1 \vee \Psi_2 | \neg \Psi | true | false$
Structural expression $\mathcal{S} := Leaf(\mathcal{L}) | VLOOKUP(\mathcal{L}_1, \mathcal{L}_2, \mathcal{L}_3) | AttrLookup(\mathcal{L}_1, \mathcal{L}_2)$
Direction $d \in \{Up, Down, Left, Right\}$ Moreover, the following shorthand can be used for brevity.

Ling($\in$, true) $\equiv \in$
FW($\mathcal{B}$, true) $\equiv \mathcal{B}$
l:Word $\equiv$ l
Word* $\equiv$ *
ConstWord(s) $\equiv$ "s"
ConstPhrase($s_1, \ldots, s_k$) $\equiv$ "$s_1 \_ \ldots \_ s_k$"

The following provides exemplary semantics of the parameterized query language. In the following examples, i, j, and k are integers, s and t are strings, $\delta$ is a real-valued proximity threshold, and b is a bounding box. Below, intermediate types used in semantics definitions are shown.

Linguistic match $M := \{l_1 \rightarrow s_1, \ldots, l_k \rightarrow s_k\}$
Linguistic answer set $W := \{M_1, \ldots, M_k\}$
Visual Match $V := \{\eta_1 \rightarrow b_1, \ldots, \eta_k \rightarrow b_k\}$
Table $T := \{(i,j) \rightarrow s\}_{i,j=1}^k$ The following depicts exemplary types of query language elements.

$\mathcal{S} : \mathcal{N} \rightarrow W$
$\mathcal{B} : b \rightarrow \langle W, V \rangle$
$\mathcal{L} : t \rightarrow W$
$\in : t \rightarrow W$
$\mathcal{Q} : \mathcal{N} \rightarrow W$
$\Phi : M \rightarrow Bool$
$\Psi : (V, \mathcal{N}) \rightarrow Bool$ Below, exemplary semantics of a parameterized query $\mathcal{Q}$ on an HTML node $\mathcal{N}$, defined via the semantics of a visual expression $\mathcal{B}$ on a bounding box b and the semantics of a structural expression $\mathcal{S}$ on an HTML node $\mathcal{N}$, are shown.

$[[VLOOKUP(\mathcal{L}_1, \mathcal{L}_2, \mathcal{L}_3)]](\mathcal{N}) = \{[[\mathcal{L}_3]](T[j,k]) | T \in Tables(\mathcal{N}) \wedge \exists k' \neq k : [[\mathcal{L}_1]](T[j,k']) \neq \emptyset \wedge [[\mathcal{L}_2]](T[1,k]) \neq \emptyset\}$
$[[AttrLookup(\mathcal{L}_1, \mathcal{L}_2)]](\mathcal{N}) = \{[[\mathcal{L}_2]](T[j,2]) | T \in Tables(\mathcal{N}) \wedge [[\mathcal{L}_1]](T[j,1]) \neq \emptyset\}$
$[[Union(\mathcal{B}_1, \mathcal{B}_2)]](b) = \cup_{b = unite(b_1, b_2)} [[\mathcal{B}_1]](b_1) \sqcup [[\mathcal{B}_2]](b_2)$
$[[\eta : \mathcal{B}]](b) = \langle W, V \sqcup \{\eta \rightarrow b\}\rangle$ where $[[\mathcal{B}]](b) = \langle W, V \rangle$
$[[\mathcal{S}]](b) = \langle W, \emptyset \rangle$ if $[[\mathcal{S}]](\mathcal{N}) = W \wedge BBox(\mathcal{N}) = b$
$[[Nearby(\eta_1, \eta_2)]](V, \mathcal{N}) = true$ iff dist($V[\eta_1], V[\eta_2]) < \delta$
$[[Layout(\eta_1, \eta_2, d)]](V, \mathcal{N}) = true$ iff $V[\eta_1]$ and $V[\eta_2]$ are aligned as d
$[[Emphasized(\eta)]](V, \mathcal{N}) = true$ iff color/size of $V[\eta]$ is emphasized in $\mathcal{N}$
$[[\mathcal{Q}_1 \vee \ldots \vee \mathcal{Q}_k]](\mathcal{N}) = \cup_{i=1}^k [[\mathcal{Q}_i]](\mathcal{N})$
$[[FW(\mathcal{B}, \Psi)]](\mathcal{N}) = \{W | [[\mathcal{B}]](BBox(\mathcal{N})) = \langle W, V \rangle \wedge [[\Psi]](V, \mathcal{N})\}$ Moreover, exemplary semantics of a linguistic pattern $\in$ on an input string t, used in the semantics of a linguistic expression L on an HTML node $\mathcal{N}$, are now shown.

$$\frac{0 \leq i < j \leq |t| \quad [\![\varepsilon]\!](t[i \ldots j]) \ni M}{[\![l{:}\varepsilon]\!] \ni M \sqcup \{l \to [i \ldots j]\}}$$

$$\frac{0 \leq j < |t|}{[\![l{:}\text{Word}]\!](t) \ni \{l \to t[j]\}}$$

$$\frac{0 \leq j < |t| \quad t[j] = s}{[\![l{:}\text{``}s\text{''}]\!](t) \ni \{l \to t[j]\}}$$

$$\frac{0 \leq i < j \leq |t| \quad t[i \ldots j] = \text{``}s_1 \sqcup \ldots \sqcup s_k\text{''}}{[\![l{:}\text{``}s_1 \sqcup \ldots \sqcup s_k\text{''}]\!](t) \ni \{l \to t[i \ldots j]\}}$$

$$\frac{0 \leq j < |t| \quad PosValue(t[j]) = p}{[\![l{:}POS(p)]\!](t) \ni \{l \to t[j]\}}$$

$$\frac{0 \leq j < |t| \quad EntityValue(t[j]) = e}{[\![l{:}\text{Entity}(e)]\!](t) \ni \{l \to t[j]\}}$$

$$\frac{0 \leq j < |t| \quad AreSynonyms(s, t[j])}{[\![l{:}Syn(s)]\!](t) \ni \{l \to t[j]\}}$$

$$\frac{0 \leq i < j \leq |t| \quad IsNP(t[i \ldots j])}{[\![l{:}NP]\!] \ni \{l \to t[i \ldots j]\}}$$

$$[\![\varepsilon?]\!](t) = \emptyset$$

$$\frac{[\![\varepsilon]\!](t) \ni M}{[\![\varepsilon?]\!](t) \ni M}$$

$$[\![\varepsilon^*]\!](t) = \emptyset$$

$$\frac{[\![\varepsilon^+]\!](t) \ni M}{[\![\varepsilon^*]\!](t) \ni M}$$

$$\frac{0 \leq j \leq |t| \quad [\![\varepsilon_1]\!](t[0 \ldots j)) \ni M_1 \quad [\![\varepsilon_2]\!](t[j \ldots |t|)) \ni M_2}{[\![\varepsilon_1 \varepsilon_2]\!](t) \ni M_1 \sqcup M_2}$$

$$\frac{\exists 0 \leq j_0 \leq \ldots \leq j_k \leq |t|: \forall i \in [1, k]: [\![\varepsilon]\!](t[j_{i-1} \ldots j_i)) \ni M_i \quad k \geq 1}{[\![\varepsilon^+]\!](t) \ni \sqcup_{i=1}^{k} M_i}$$

$$[\![Ling(\varepsilon, \Phi)]\!](t) = \{M \in [\![\varepsilon]\!](t) \mid [\![\Phi]\!](M)\}$$

$$[\![\mathcal{L}_1 \vee \ldots \vee \mathcal{L}_k]\!](t) = \sqcup_{i=1}^{k} [\![\mathcal{L}_i]\!](t)$$

$$[\![Regex(l, s)]\!](M) = \text{true } \textit{iff } M[l] \text{ matches } \textit{regex } s$$

$$[\![\text{Same Sentence}(l_1, l_2)]\!](M) = \text{true } \textit{iff } M[l_1],$$

$$M[l_2] \text{ are from same sentence}$$

$$[\![Leaf(\mathcal{L})]\!](N) = [\![\mathcal{L}]\!](Text(N))$$

A parameterized query $\mathcal{Q}$ (e.g., the parameterized query 130) unites three types of expressions: visual expressions $\mathcal{B}$ (e.g., the visual expression 606), structural expressions $\mathcal{S}$ (e.g., the structural expression 604), and linguistic expressions $\mathcal{L}$ (e.g., the linguistic expression 602). A linguistic expression is the simplest form of a structural expression, and a structural expression is the simplest form of a visual expression. Together, the linguistic expressions, the visual expressions, and the structural expressions cover a range of patterns used in search strategies.

A parameterized query $\mathcal{Q}$ is parameterized with a tuple of user query arguments $\vec{v}$. During its execution on a webpage, some of the strings in $\mathcal{Q}$ are replaced with user-provided values $v_k$, taken from $\vec{v}$. Thus, in the above query language syntax, strings that are not a label name can be either a constant string literal w or a user query argument $v_k$.

Linguistic expressions are now described in greater detail. A linguistic expression $\mathcal{L}$ (e.g., the linguistic expression 602) describes a string pattern using linguistic and semantic matching constructors. The linguistic expression includes a linguistic pattern $\in$ and a linguistic constraint $\Phi$. Linguistic patterns, when executed against an input string t, collect multiple matches M, and linguistic constraints filter out matches with undesired properties.

A linguistic pattern $\in$ is executed against an input string t. As shown in the exemplary semantics described above, string can be content Text($\mathcal{N}$) of some HTML node $\mathcal{N}$. The result of this execution is a set W of linguistic matches M. A linguistic match M is a mapping from ID labels l of $\in$'s subexpressions to matched substrings of the input string t. Intuitively, $\in$ acts similarly to a regular expression: when $\in$ finds a successful match within t, every subexpression of $\in$ corresponds to some substring t' of the input string t. Some of these subexpressions l:$\in$ are explicitly marked with labels l, similarly to named capturing groups in regular expressions. Matches of such subexpressions are reflected in the mapping M as l $\mapsto$ t'.

In the context of linguistic expressions, strings can be considered as lists of tokens. A token is a natural language primitive (a word or a punctuation symbol). Since strings are not operated on at the level of single characters, it may be convenient to redefine standard notation |s| and s[i] as the number of tokens in the string s, and the $i^{th}$ token of s (starting from 0), respectively. Similarly, s[i . . . j] is a substring of s starting with the $i^{th}$ token and ending with the $(j-1)^{th}$ token.

Linguistic patterns can be similar to regular expressions in a sense of their composition methods. A linguistic pattern $\in$ matches either some atom (a primitive token or a sequence of tokens), a token satisfying a linguistic predicate, or a string composed of submatches of subexpressions.

Primitive matches: A linguistic pattern Word can match a single token. l: Word can be denoted as l, since label l' can be a variable that captures a word match in the mapping M. Linguistic patterns ConstWord(s) and ConstPhrase($s_1, \ldots, s_k$) match only if they find a fixed token s or a fixed sequence of tokens "$s_1 \sqcup \ldots \sqcup s_k$", respectively, in the input string t.

Composite matches: Operators +, ?, and * (Kleene star) borrow their semantics from regular expressions. The mappings M can be composed from the matches found in subexpressions. For + and *, whose subexpression matches multiple times in the substring, the found mappings can be put in the final linguistic match M. Thus, the same label l' may occur multiple times in the linguistic match M, making it a multi-map.

Linguistic predicates: Many of the forms of linguistic patterns are predicates, which match a token or a sequence of tokens only if it satisfies some linguistic property. Several exemplary linguistic predicates are shown above in the exemplary query language syntax and semantics. Yet, it is contemplated that other linguistic predicates can be implemented, assuming the existence of corresponding NLP algorithms.

Below are examples of linguistic predicates. POS(p) can be used to match a single token if its part of speech is p. Entity(e) can be used to match a sequence of tokens that is classified as a named entity of type e (e.g., person name, organization, etc.). NP can be used to match a sequence of tokens if it constitutes a noun phrase in the syntactic parse tree of the input sentence. Syn(s) can be used to match a single token that is synonymic to s.

Moreover, corresponding functions PosValue(s), EntityValue(s), IsNP(s), and AreSynonyms($s_1, s_2$) can be employed; these functions can implement NLP algorithms on strings. Implementation of these functions is further described herein.

Linguistic constraints: Every match M, returned by a linguistic pattern $\in$, is filtered through a linguistic constraint $\Phi$. The final set of matches W, returned by a linguistic expression $\mathcal{L}$, includes those matches M that have not been filtered out by $\Phi$. This language element allows specifying advanced properties of input sentences, which involve multiple subexpressions of $\in$ and cannot be defined as a linguistic predicate.

Two exemplary linguistic constraints are provided below, yet other linguistic constraints are intended to fall within the scope of the hereto appended claims. SameSentence($l_1,l_2$) returns true iff matches captured by $l_1$ and $l_2$ belong to the same sentence within the input string t. Regex(l,s) returns true iff the match captured by l satisfies the regular expression s.

Structural expressions are now described in further detail. A structural expression $\mathcal{S}$ (e.g., the structural expression 604) describes a structural pattern of information within a logical table present in $\mathcal{N}$. The leaf-level elements of a structural expression $\mathcal{S}$ are linguistic expressions $\mathcal{L}$.

A structural expression $\mathcal{S}$ is executed against an HTML node $\mathcal{N}$ and returns an answer set W. In the base case $\mathcal{S}$ =Leaf($\mathcal{L}$), the answer set W is a result of executing $\mathcal{L}$ against the content of $\mathcal{N}$.

Two other types of structural expressions, AttrLookup ($\mathcal{L}_1,\mathcal{L}_2$) and VLOOKUP ($\mathcal{L}_1,\mathcal{L}_2,\mathcal{L}_3$), describe two structural patterns that can arise in a webpage. A structural pattern is a particular alignment of structured information on a webpage, such as a relational table or a list of attributes. If the information is present in one of those structured forms, a relational technique (e.g., VLOOKUP, AttrLookup, etc.) can be used to select required information from the structure.

However, information of a webpage often may not be present in a clean tabular format. Yet, the information is often semi-structured: it follows a recognizable pattern, from which the implicit tabular structure can be recovered. For example, consider a list of "⟨attribute⟨:⟩value⟩" lines, each presenting an attribute and a corresponding value, separated by a colon. Such a list can be interpreted as a 2-column table of attributes along with respective, corresponding values. Such implicit tables can be referred to as logical tables. Further, a Tables($\mathcal{N}$) function can return a set of logical tables present in the HTML node $\mathcal{N}$. A table T is indexed from 1 through the number of rows/columns. Each cell T[j,k] is the textual content of the corresponding logical cell (e.g., the content of a <td> node, or a substring of an "⟨attribute⟨:⟩value⟩" line in a paragraph, etc.).

Constructor VLOOKUP ($\mathcal{L}_1,\mathcal{L}_2,\mathcal{L}_3$) represents a VLOOKUP operation. Arguments for this operation include a key expression $\mathcal{L}_1$, a header expression $\mathcal{L}_2$, and a content expression $\mathcal{L}_3$. Given a logical table T, if $\mathcal{L}_1$ matches any cell T[j,k'] in $j^{th}$ row, and $\mathcal{L}_2$ matches any header cell T[1,k] in $k^{th}$ column of the first row, the algorithms described herein can execute the content expression $\mathcal{L}_3$ on the intersection cell T[j,k], and return the result.

Constructor AttrLookup ($\mathcal{L}_1,\mathcal{L}_2$) represents an attribute lookup operation. Arguments for this operation are the attribute expression $\mathcal{L}_1$ and the content expression $\mathcal{L}_2$. Given a logical table T of ≥2 columns, where $\mathcal{L}_1$ matches any cell T[j,1] in the $j^{th}$ row of the first column (attribute name), the algorithms described herein execute the content expression $\mathcal{L}_2$ on the neighboring cell T [j,2], and return the result.

Figure 7:
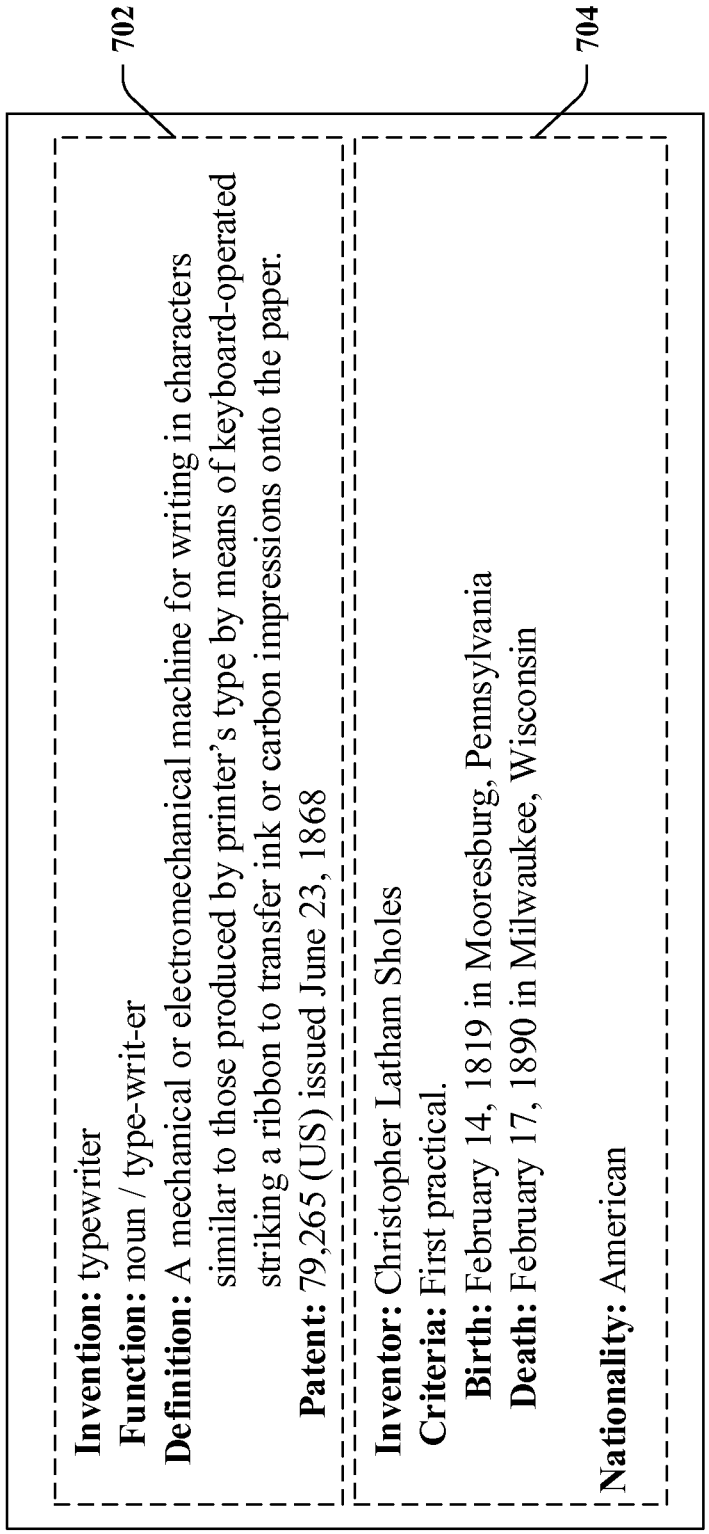
FIG. 7 illustrates an exemplary plain text attribute table from which an answer string can be extracted.

Referring to FIG. 7, illustrated is an exemplary plain text attribute table about the inventor of the typewriter. Two separate <table>s in the HTML markup are depicted. FIG. 7 shows an example of a logical table about the inventor of the typewriter, taken from the Web. This table is not a 2-column <table> tag, as it might appear to the viewer. Instead, it is represented as two <table> tags (highlighted by dashed lines 702 and 704), with pieces of plain text information within. Nevertheless, if $\mathcal{N}$ is a <div> containing both <table>s, the function Tables($\mathcal{N}$) can extract a single 2-column attribute table from it.

The following structural expression can be used to extract information from such logical table:

$\mathcal{S}$ =AttrLookup(Syn("inventor"), Entity(Person))

This expression is not parameterized with user arguments, and it extracts the attribute value for any row corresponding to the attribute "inventor" or some synonym of "inventor". In order to bind $\mathcal{S}$ to the particular invention (e.g., "typewriter"), additional constraints can be introduced, for example.

Again, reference is made to FIG. 6. Visual expressions $\mathcal{B}$ (e.g., the visual expression 606) can match webpage elements with particular stylistic properties. Visual expressions make use of presentational attributes of an HTML node, its CSS style, position, and bounding box.

A visual expression $\mathcal{B}$ is executed against a bounding box b. Bounding boxes can be used instead of HTML nodes, since not every visually distinguishable webpage element is represented by a single HTML node. Accordingly, presentational properties of a webpage can be used as part of the automated search strategies.

The result of the execution of $\mathcal{B}$ is a tuple of a linguistic answer set W, matched by the lower subexpressions, and a visual match V. A visual match is a mapping of ID labels of visual expressions η to bounding boxes b. Similarly to named capturing groups in regular expressions, when a labeled visual expression η:$\mathcal{B}$ matches a bounding box b, this is reflected in a returned mapping as η ↦ b.

A simple form of a visual expression can be a structural expression S. The corresponding visual expression $\mathcal{B}$ matches a bounding box b if $\mathcal{S}$ matches an HTML node $\mathcal{N}$, encompassed by b.

Constructor Union($\mathcal{B}_1,\mathcal{B}_2$) matches a union of two bounding boxes unite($b_1,b_2$) if its subexpressions $\mathcal{B}_1$ and $\mathcal{B}_2$ match $b_1$ and $b_2$, respectively. The union of two bounding boxes unite($b_1,b_2$) is defined as the smallest rectangle that contains both $b_1$ and $b_2$.

Visual constraints: The top-level parameterized query $\mathcal{Q}$ can include a visual expression $\mathcal{B}$ together with a visual constraint $\Psi$. Similarly to linguistic constraints, visual constraints filter out false positive matches V, returned by the execution of $\mathcal{B}$. Three exemplary visual constraints are set forth below, yet others are intended to fall within the scope of the hereto appended claims.

Constraint Nearby($η_1,η_2$) checks the bounding boxes V[$η_1$] and V[$η_2$] for proximity. This visual constraint compares the distance between the bounding boxes with a predefined relative proximity threshold δ.

Constraint Layout($η_1,η_2$,d) checks whether bounding boxes $b_1$=V [$η_1$] and $b_2$=V[$η_2$] are aligned according to the layout d. Thus, $b_1$ should lie within a sector defined by the center of $b_2$ and the two corners of $b_2$ in the direction d.

Constraint Emphasized(i) checks whether the content of the bounding box V[η] is emphasized with respect to its surrounding elements. This includes change of colors, fonts, font sizes, usage of headers (<h1> through <h6>), etc.

Figure 8:
FIG. 8 illustrates an exemplary webpage from which an answer string can be extracted.

According to an example, a parameterized query can be executed to collect phone numbers from multiple personal contact pages of researchers, similar to a webpage 800 shown in FIG. 8. The following exemplary parameterized query collects the desired phone number(s) from such a webpage:

$Q = FW(\text{Union}(\eta_t : \text{LEAF}(v_1), \eta_b : S_b), \Psi)$
$\Psi = \text{Layout}(\eta_t, \eta_b, \text{Down}) \wedge \text{Nearby}(\eta_t, \eta_b) \wedge \text{Emphasized}(\eta_t)$
$S_b = \text{AttrLookup}(\text{Syn}(\text{``phone''}), L_a)$
$L_a = \text{Ling}(l, \text{Regex}(l, \text{``\textbackslash(?\textbackslash d+\textbackslash)?\textbackslash W\textbackslash d+\textbackslash W\textbackslash d+''}))$ When $Q$ is executed with the arguments $\vec{v} = (\text{``Joe Smith''})$, the entire query $Q$ matches any phone number in a logical attribute table such that this person's name can be found above the table, within the proximity threshold, and is emphasized.

Again, reference is made to FIG. 6. As noted above, the linguistic analysis component 608 can interpret linguistic expression(s) of the parameterized query 130, the structural analysis component 610 can interpret structural expression(s) of the parameterized query 130, and the visual analysis component 612 can interpret visual expression(s) of the parameterized query 130.

The linguistic analysis component 608 can use NLP algorithms to effectuate the interpretation of the linguistic expression(s) of the parameterized query 130. To support interpretation of linguistic predicates, the linguistic analysis component 608 can use algorithms for the functions EntityValue(s), PosValue(s), IsNP(s), and AreSynonyms($s_1, s_2$), which can be implemented using various algorithms in NLP. The algorithms can be used for named entity recognition, syntactic parsing, and part-of-speech tagging. To implement the AreSynonyms($s_1, s_2$) function, a word synonymy library can be used, for example. Yet, it is to be appreciated that the claimed subject matter is not limited to the foregoing examples.

Further, as part of the interpretation of the linguistic expression(s), the linguistic analysis component 608 can refine [[∈]] for enhanced performance on large webpages, called anchoring. A naïve implementation of matching a linguistic expression ∈ against a string t can include attempting to find a linguistic match for every possible starting token in t. This can be inefficient, especially when dealing with Kleene star operator *. Instead, a matching procedure can be anchored by the linguistic analysis component 608. Anchoring can include identifying a set of constant strings (anchors), if any, that match as particular subexpressions of ∈. If anchors are given, the matching can start with a linear search for anchor occurrences in text, and proceed with matching other subexpressions of ∈ to the left and to the right of occurrences. If no anchors are given, the algorithm falls back to naïve matching.

Moreover, the structural analysis component 610 can interpret structural expression(s) of the parameterized query 130. Interpretation of a structural expression by the structural analysis component 610 can use the Tables($N$) function, which implements logical table detection. Such function can extract information from the HTML node $N$ that is likely to be perceived as a table by an end user. Below are various exemplary strategies for detecting logical tables within an HTML node that can be implemented by the structural analysis component 610; yet, it is contemplated that other examples are intended to fall within the scope of the hereto appended claims.

According to an example, the structural analysis component 610 can detect an HTML table based on a <table> tag. A <table> tag can define a logical table unless it is used for webpage layout (e.g., has multiple non-primitive pieces of content within it, possibly nested tables).

Figures 9, 10:
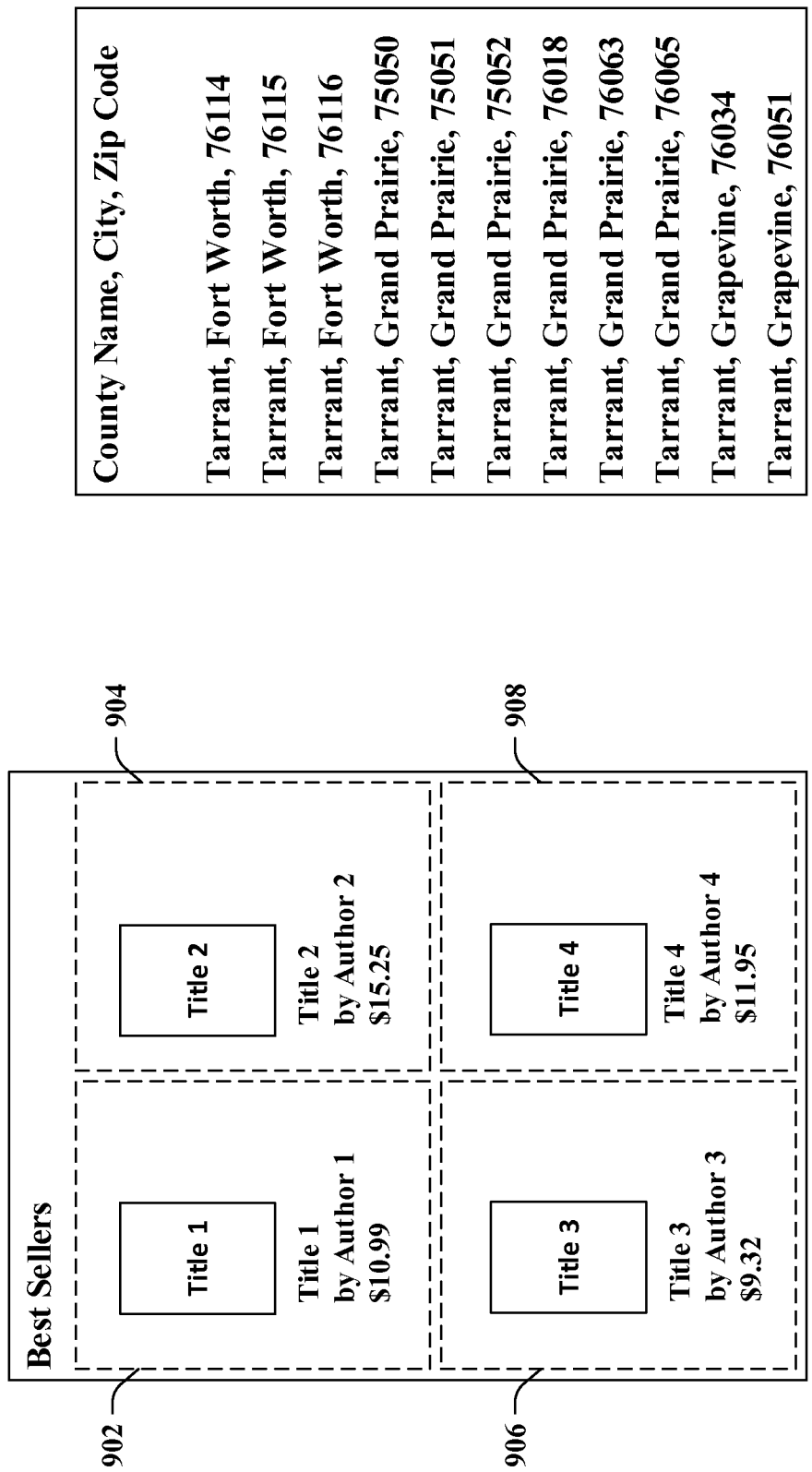
FIG. 9 illustrates an exemplary logical table from which an answer string can be extracted.
FIG. 10 illustrates another exemplary logical table from which an answer string can be extracted.

By way of another example, the structural analysis component 610 can detect a visual table. A grid of <div>s or similar block elements can constitute a logical table if bounding boxes are aligned in a grid structure. FIG. 9 shows an example of a logical table built with <div> elements (shown by dotted lines 902, 904, 906, and 908). The structural analysis component 610 can detect such tables by collecting a tree of bounding boxes of HTML nodes within $N$, and then building grids of those bounding boxes that are aligned next to each other.

Pursuant to another example, the structural analysis component 610 can detect a plain text table. Often the information can be presented as a table by marking it with punctuation signs and separators in plain text, instead of HTML tags. FIG. 7 and FIG. 8 show examples of such plain text tables, with a colon being a separator between two columns. FIG. 10 shows another example, where the intended table is relational, and the separator between the columns is a comma.

According to an example, the structural analysis component 610 can detect plain text tables by maintaining a set of common separators (e.g., colon, comma, space, etc.), and attempting to split entire paragraphs of text by such separators, picking the one that gives most appropriate looking results. However, following this example, even if the separator is "correct" (e.g., it actually splits the logical columns in the paragraph), it can also be present within some of the logical cells. By way of illustration, if whitespace is used instead of comma for column separation in the example shown in FIG. 10, this naïve algorithm may detect four columns instead of three for "Fort Worth" and "Grand Prairie" rows.

Thus, the structural analysis component 610 can employ a different automatic splitting approach instead of the above-noted naïve algorithm. More particularly, the structural analysis component 610 can fix a candidate separator from the common list. For this separator and a fixed HTML node $N$, the structural analysis component 610 can start with building a list of lines in Text($N$) that have consistent splitting with respect to this separator (e.g., the same number of columns>1). The rest of the lines are passed to an underlying programming-by-example (PBE) system that automatically determines likely syntactic string transformations from few examples by using ranking schemes. The list of consistent lines can be used as a list of examples for the underlying PBE system. The output of PBE system can be a list of correct outputs (splits) for the rest of the lines, or a failure signal. The structural analysis component 610 can automatically check the correctness of this output later, by comparing it with answer candidates during clustering.

Further, the visual analysis component 612 can interpret visual expression(s) of the parameterized query 130. The visual analysis component 612 can interpret visual expressions by using run-time presentational attributes of HTML nodes $N$. The visual analysis component 612 can cause a browser to render each webpage in memory on a virtual canvas of a preset size (e.g., 1920×1080 pixels). After rendering, information about the bounding box of each HTML node $N$ can be collected and used as a value of BBox($N$). Similarly, run-time values of CSS attributes can be collected and used for evaluating visual constraints $\Psi$.

The task execution system 110 set forth herein is now described in greater detail. As noted, the task execution system 110 can execute an instantiation of the parameterized web program 118. The task execution system 110 can implement a parameterized web program execution algorithm as shown in the following exemplary pseudo code.

```
Function SEARCH(𝒫 = <q, σ, Q, l_a>, v⃗)
1.  U ← the results of a search engine on q(v⃗)
2.  Substitute v_k in Q with values from v⃗
3.  𝒞 ← ∅           // set of clusters, C_i = {<s_k, {u_j}_{j-1}^{nik}>}_{k-1}^{mi}
4.  for all URLs u_j ∈ U do
5.      𝒩 ← the <body> node of u_j
6.      S_j ← {M[l_a]|M ∈ [[Q]](𝒩)}
7.      for all answer strings s_k ∈ S_j do
8.          C_j ← {<s_k, u_j>}
9.          for all C ∈ 𝒞 s.t. ∃s' ∈ C:σ(s_k, s') do merge C_j with C
10.         𝒞 ← 𝒞 ∪ {C_j}
11. for all final clusters C_i ∈ 𝒞 do
12.     a_i ← the most frequent string representation s_k ∈ C_i
13.     β_i ← (1/|U|)Σ_{j=1}^{|U|}Σ_{s∈C_i} c(s, u_j)/|s_j|   where: c(s, u_j) = number of times s
        was found at URL u_j
14.     U_i ← union of all source URLs for all s_k ∈ C_i
15.     yield result <a_i, β_i, U_i>
```

In the foregoing pseudo code, the SEARCH function can take a parameterized web program 𝒫 (e.g., the parameterized web program 118) and a tuple of user query arguments v⃗, and return a set of answer strings, augmented with their corresponding confidence scores and source URLs. The execution algorithm is shown as the SEARCH(𝒫, v⃗) function. The algorithm starts with querying the search engine 102 for URLs with a seed query (line 1) and filling in user arguments in the parameterized query 𝒬 (line 2). Thereafter, the algorithm proceeds with matching the query 𝒬 with URLs in the obtained list of search results U.

During matching, the algorithm maintains a set of clusters 𝒞. Every cluster $C_i \in \mathcal{C}$ represents a single logical answer. A cluster is a multi-set of string representations $s_k$, augmented with sets of their source URLs. A cluster can include multiple occurrences of the same answer string $s_k$, and the same answer string may occur multiple times on a single webpage (URL). Every time the algorithm finds a new answer string $s_k$ on some webpage $u_j$, a new singleton cluster $\{\langle s_k, \{u_j\}\rangle\}$ is constructed and merged with existing clusters in 𝒞 that contain strings similar to $s_k$, according to the similarity function σ (lines 7-10).

After matching, the algorithm extracts logical answers and corresponding confidence scores from the collected set of clusters 𝒞 (lines 11-15). For each cluster $C_i \in \mathcal{C}$, a most frequent answer string in such cluster is considered as a representative answer of this cluster. A confidence score of such answer string is calculated using Bayes' theorem:

$$\beta_i = \frac{1}{|U|}\sum_{j=1}^{|U|} p(C_i | u_j)$$

$$p(C_i | u_j) = \sum_{s \in C_i} \frac{c(s, u_j)}{|S_j|}$$

In the foregoing, $|S_j|$ is the number of answer strings extracted from a webpage $u_j$, and $c(s,u_j)$ is the number of times s was found in $u_j$.

As set forth herein, parameterized web programming is described. More particularly, a programming model is described herein, where functions are defined as repeatable search procedures, operating over semi-structured content of documents specified by search results returned by the search engine 102. Once defined, these functions can be used multiple times with different user query arguments. Three possible applications of parameterized web programming are set forth above, namely factoid micro-segments in search engines, repeatable batch queries, and problem generation in language comprehension; yet, it is to be appreciated that other applications of parameterized web programming are intended to fall within the scope of the hereto appended claims.

Further, a DSL is presented that allows end users and developers to express semantic patterns of search strategies, thereby mitigating manual exploration of search engine results. The DSL can leverage cross-disciplinary technologies such as, for instance, browser rendering APIs, NLP tools, and programming by example technologies. Techniques set forth herein can provide enhanced precision and recall in comparison to conventional approaches, and can assist in automating knowledge discovery on the Web.

Figure 11:
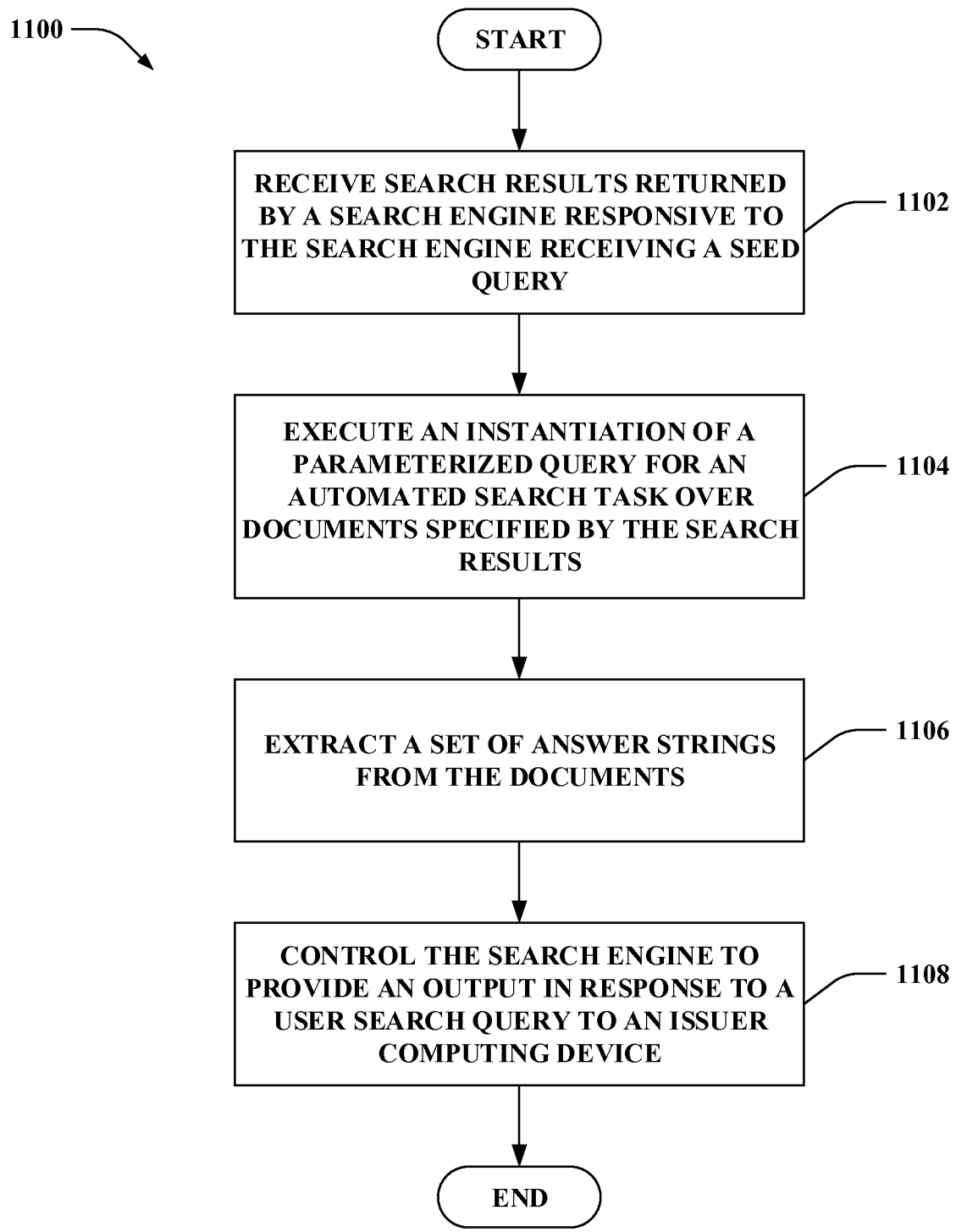
FIG. 11 is a flow diagram that illustrates an exemplary methodology of controlling execution of an automated search task on search results returned by a search engine.
Figure 12:
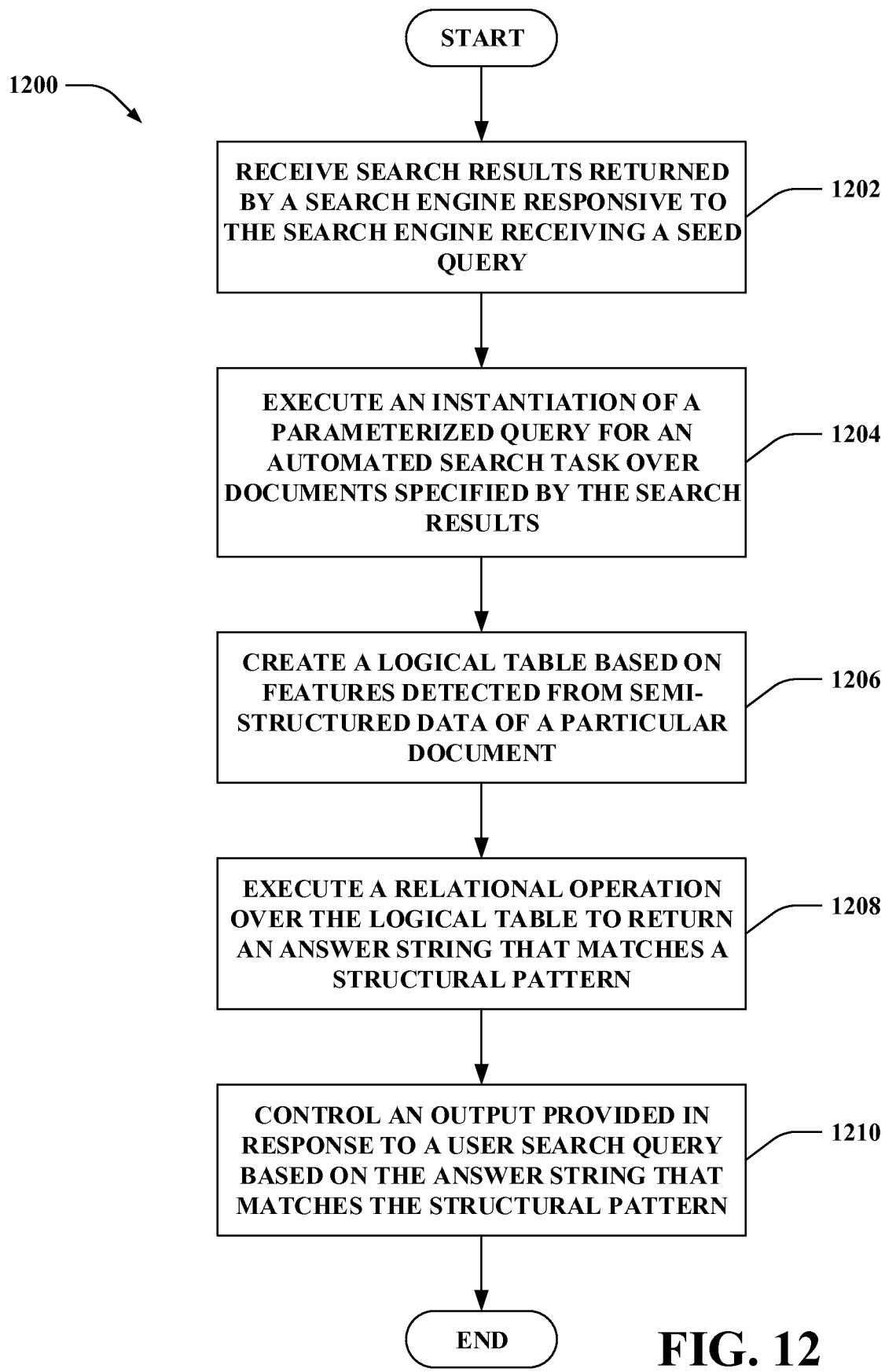
FIG. 12 is a flow diagram that illustrates another exemplary methodology of controlling execution of an automated search task on search results returned by a search engine.

FIGS. 11-12 illustrate exemplary methodologies relating to controlling execution of automated search tasks on search results returned by a search engine. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 11 illustrates a methodology 1100 of controlling execution of an automated search task on search results returned by a search engine. At 1102, the search results returned by the search engine responsive to the search engine receiving a seed query can be received. The seed query can be formed based on a user search query from an issuer computing device. At 1104, an instantiation of a parameterized query for the search task can be executed over documents specified by the search results. The instantiation of the parameterized query can describe a linguistic pattern, a structural pattern, and a visual pattern. At 1106, a set of answer strings can be extracted from the documents responsive to execution of the instantiation of the parameterized query. The answer strings in the set can match the linguistic pattern, the structural pattern, and the visual pattern. At 1108, the search engine can be controlled to provide an output in response to the user search query to the issuer computing device. The output can be based on the set of answer strings extracted from the documents.

With reference to FIG. 12, illustrated is another methodology 1200 of controlling execution of an automated search task on search results returned by a search engine. At 1202, the search results can be received. The search results can be returned by the search engine responsive to the search engine receiving a seed query. The seed query can be formed based on a user search query. At 1204, an instantiation of a parameterized query for the automated search task can be executed over documents specified by the search results. The instantiation of the parameterized query can describe a structural pattern. At 1206, a logical table can be created based on features detected from semi-structured data of a particular document, where the documents include the particular document. At 1208, a relational operation can be executed over the logical table to return an answer string that matches the structural pattern. At 1210, an output provided in response to the user search query can be controlled based on the answer string that matches the structural pattern.

Figure 13:
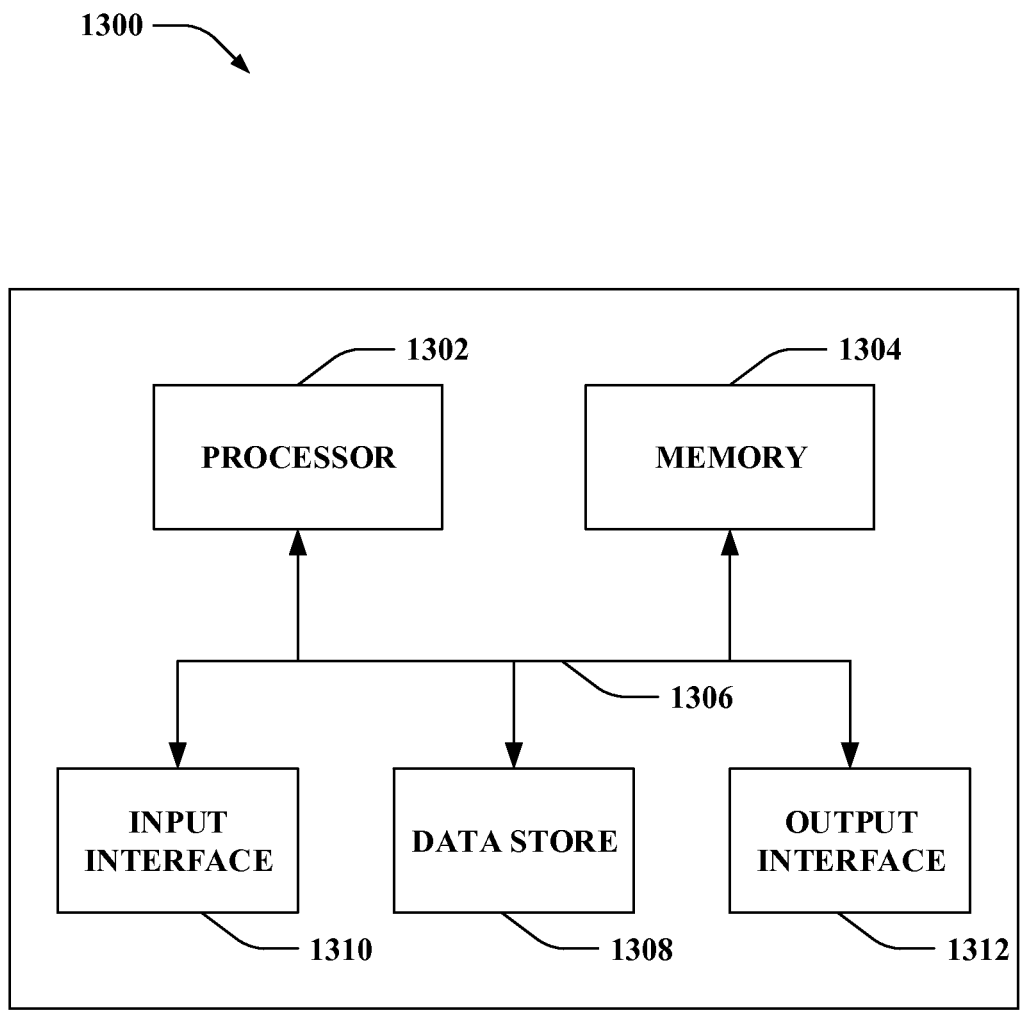
FIG. 13 illustrates an exemplary computing device.

Referring now to FIG. 13, a high-level illustration of an exemplary computing device 1300 that can be used in accordance with the systems and methodologies disclosed herein is illustrated. For instance, the computing device 1300 may be used in a system that creates a parameterized web program as described herein. By way of another example, the computing device 1300 can be used in a system that executes an instantiation of a parameterized web program. For instance, the computing system 104, the computing system 112, the computing system 302, the computing system 402, the computing system 502, or the computing system 510 can include the computing device 1300. Pursuant to another example, the issuer computing device 122 can be or include the computing device 1300 (or the computing device 1300 can be or include the issuer computing device 122). The computing device 1300 includes at least one processor 1302 that executes instructions that are stored in memory 1304. The instructions may be, for instance, instructions for implementing functionality described as being carried out by one or more components discussed above or instructions for implementing one or more of the methods described above. The processor 1302 may access the memory 1304 by way of a system bus 1306. In addition to storing executable instructions, the memory 1304 may also store parameterized web programs, parameterized queries, and so forth.

The computing device 1300 additionally includes a data store 1308 that is accessible by the processor 1302 by way of the system bus 1306. The data store 1308 may include executable instructions, parameterized web programs, logs, parameterized queries, etc. The computing device 1300 also includes an input interface 1310 that allows external devices to communicate with the computing device 1300. For instance, the input interface 1310 may be used to receive instructions from an external computer device, from a user, etc. The computing device 1300 also includes an output interface 1312 that interfaces the computing device 1300 with one or more external devices. For example, the computing device 1300 may display text, images, etc. by way of the output interface 1312.

It is contemplated that the external devices that communicate with the computing device 1300 via the input interface 1310 and the output interface 1312 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1300 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1300 may be a distributed system. Thus, for instance, several devices may be in communication by way of a network connection and may collectively perform tasks described as being performed by the computing device 1300.

Figure 14:
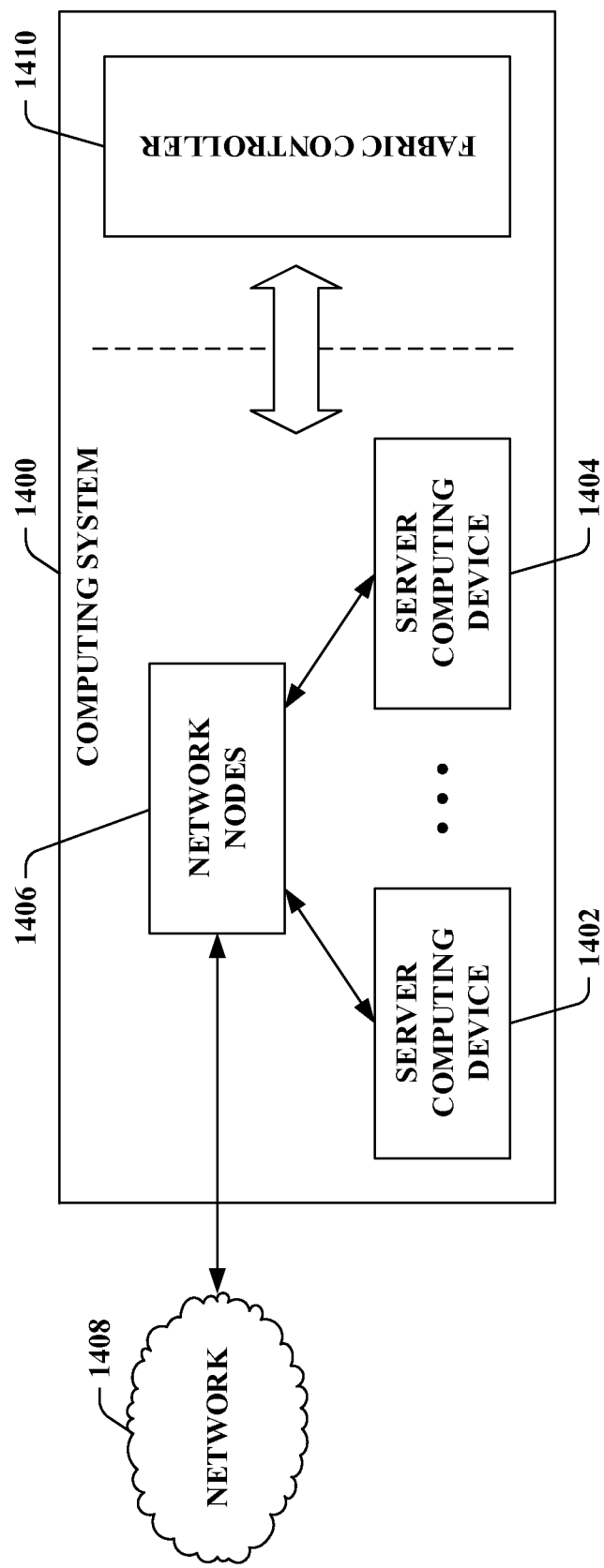
FIG. 14 illustrates an exemplary computing system.

Turning to FIG. 14, a high-level illustration of an exemplary computing system 1400 that can be used in accordance with the systems and methodologies disclosed herein is illustrated. For instance, the computing system 1400 can be or include the computing system 104, the computing system 112, the computing system 302, the computing system 402, the computing system 502, or the computing system 510. Additionally or alternatively, the computing system 104, the computing system 112, the computing system 302, the computing system 402, the computing system 502, or the computing system 510 can be or include the computing system 1400.

The computing system 1400 includes a plurality of server computing devices, namely, a server computing device 1402, . . . , and a server computing device 1404 (collectively referred to as server computing devices 1402-1404). The server computing device 1402 includes at least one processor and memory; the at least one processor executes instructions that are stored in the memory. The instructions may be, for instance, instructions for implementing functionality described as being carried out by one or more components discussed above or instructions for implementing one or more of the methods described above. Similar to the server computing device 1402, at least a subset of the server computing devices 1402-1404 other than the server computing device 1402 each respectively include at least one processor and memory. Moreover, at least a subset of the server computing devices 1402-1404 include respective data stores.

Processor(s) of one or more of the server computing devices 1402-1404 can be or include the processor(s) 106, the processor(s) 114, the processor(s) 304, the processor(s) 404, the processor(s) 504, or the processor(s) 512. Further, memory (or memories) of one or more of the server computing devices 1402-1404 can be or include the memory 108, the memory 116, the memory 306, the memory 406, the memory 506, or the memory 514. Moreover, the memory (or memories) of one or more of the server computing devices 1402-1404 and/or a data store (or data stores) of one or more of the server computing devices 1402-1404 can be or include the computer-readable storage 408.

The computing system 1400 further includes various network nodes 1406 that transport data between the server computing devices 1402-1404. Moreover, the network nodes 1402 transport data from the server computing devices 1402-1404 to external nodes (e.g., external to the computing system 1400) by way of a network 1408. The network nodes 1402 also transport data to the server computing devices 1402-1404 from the external nodes by way of the network 1408. The network 1408, for example, can be the Internet, a cellular network, or the like. The network nodes 1406 include switches, routers, load balancers, and so forth.

A fabric controller 1410 of the computing system 1400 manages hardware resources of the server computing devices 1402-1404 (e.g., processors, memories, data stores, etc. of the server computing devices 1402-1404). The fabric controller 1410 further manages the network nodes 1406. Moreover, the fabric controller 1410 manages creation, provisioning, de-provisioning, and supervising of virtual machines instantiated upon the server computing devices 1402-1404.

Various examples are now set forth.

Example 1

A method of controlling execution of an automated search task on search results returned by a search engine, comprising: receiving the search results returned by the search engine responsive to the search engine receiving a seed query, the seed query being formed based on a user search query from an issuer computing device; executing an instantiation of a parameterized query for the automated search task over documents specified by the search results, the instantiation of the parameterized query describes a linguistic pattern, a structural pattern, and a visual pattern; responsive to execution of the instantiation of the parameterized query, extracting a set of answer strings from the documents, the answer strings in the set match the linguistic pattern, the structural pattern, and the visual pattern; and controlling the search engine to provide an output in response to the user search query to the issuer computing device, the output based on the set of answer strings extracted from the documents.

Example 2

The method according to Example 1, controlling the search engine to provide the output in response to the user search query to the issuer computing device further comprises: selecting a particular answer string from the set of answer strings extracted from the documents; and controlling the search engine to provide the particular answer string to the issuer computing device for presentation in response to the user search query.

Example 3

The method according to Example 2, further comprising: computing respective confidence scores for the answer strings in the set; and selecting the particular answer string from the set of answer strings based on the respective confidence scores for the answer strings in the set.

Example 4

The method according to any of Examples 1-3, further comprising: identifying respective source search results for the answer strings in the set, a source search result for an answer string specifies a document from which the answer string is extracted; and computing respective confidence scores for the answer strings in the set; wherein controlling the search engine to provide the output in response to the user search query to the issuer computing device further comprises: causing the search engine to rank the search results based on: the set of answer strings extracted from the documents; the respective source search results for the answer strings in the set; and the respective confidence scores for the answer strings in the set; and controlling the search engine to provide the search results as ranked to the issuer computing device for presentation in response to the user search query.

Example 5

The method according to any of Examples 1-4, further comprising: extracting content around a particular answer string from a document, the particular answer string being extracted from the document, the set of answer strings comprises the particular answer string; wherein controlling the search engine to provide the output in response to the user search query to the issuer computing device further comprises: controlling the search engine to provide the particular answer string and the content around the particular answer string to the issuer computing device for presentation in response to the user search query.

Example 6

The method according to any of Examples 1-5, further comprising: evaluating whether the user search query received from the issuer computing device belongs to a micro-segment of queries; responsive to the user search query being identified as belonging to the micro-segment of queries, forming the seed query for the micro-segment of queries based on the user search query; and inputting the seed query to the search engine; wherein the parameterized query is predefined for the micro-segment of queries.

Example 7

The method according to any of Examples 1-6, wherein: the parameterized query comprises a linguistic expression that describes the linguistic pattern, a structural expression that describes the structural pattern, and a visual expression that describes the visual pattern; and the linguistic expression, the structural expression, and the visual expression are predefined in a domain-specific language.

Example 8

The method according to any of Examples 1-7, executing the instantiation of the parameterized query for the automated search task over the documents specified by the search results further comprises: creating a logical table based on features detected from semi-structured data of a particular document, wherein the documents comprise the particular document; and executing a relational operation over the logical table to return an answer string that matches the structural pattern.

Example 9

The method according to any of Examples 1-8, further comprising: storing the user search query and the set of answer strings in computer-readable storage.

Example 10

The method according to Example 9, further comprising: tracking a duration of time of the execution of the instantiation of the parameterized query; prior to completion of the execution of the instantiation of the parameterized query and responsive to the duration of time of the execution of the instantiation of the parameterized query exceeding a threshold time duration: controlling the search engine to provide the search results to the issuer computing device for presentation in response to the user search query; wherein the execution of the instantiation of the parameterized query continues to the completion to extract the set of answer strings from the documents; and when the duration of time of the execution of the instantiation of the parameterized query is less than or equal to the threshold time duration and responsive to the completion of the execution of the instantiation of the parameterized query, controlling the search engine to provide the output based on the set of answer strings extracted from the documents to the issuer computing device for presentation in response to the user search query.

Example 11

The method according to any of Examples 9-10, further comprising: retrieving the set of answer strings from the computer-readable storage responsive to a subsequent instance of the user search query; and controlling the search engine to provide an output in response to the subsequent instance of the user search query based on the set of answer strings retrieved from the computer-readable storage.

Example 12

The method according to any of Examples 1-11, further comprising clustering the answer strings in the set based on an application-specific similarity function.

Example 13

A computing system, comprising: at least one processor; and memory comprising a task execution system, the task execution system being executable by the at least one processor, the task execution system comprising: an interface component that receives search results returned by a search engine responsive to the search engine receiving a seed query, the seed query being formed based on a user search query; a query interpretation component that executes an instantiation of a parameterized query over documents specified by the search results, the instantiation of the parameterized query describes a structural pattern, the query interpretation component further comprises: a structural analysis component that: creates a logical table based on features detected from semi-structured data of a particular document, wherein the documents comprise the particular document; and executes a relational operation over the logical table to return an answer string that matches the structural pattern; and an output management component that controls an output provided in response to the user search query based on the answer string that matches the structural pattern.

Example 14

The computing system according to Example 13, wherein: the parameterized query further describes a linguistic pattern and a visual pattern; and the query interpretation component, responsive to execution of the instantiation of the parameterized query, extracts a set of answer strings from the documents, the answer strings in the set match the linguistic pattern, the structural pattern, and the visual pattern.

Example 15

The computing system according to any of Examples 13-14, the structural analysis component creates the logical table based on detected grid alignment of bounding boxes of nodes included in the particular document.

Example 16

The computing system according to any of Examples 13-15, the structural analysis component creates the logical table based on tags included in the particular document.

Example 17

The computing system according to any of Examples 13-16, the structural analysis component creates the logical table based on plain text separators included in the particular document.

Example 18

A computing system, comprising: at least one processor; and memory comprising: a parameterized query comprising a linguistic expression that describes a linguistic pattern, a structural expression that describes a structural pattern, and a visual expression that describes a visual pattern; and a task execution system, the task execution system being executable by the at least one processor, the task execution system comprising: an interface component that receives search results returned by a search engine responsive to the search engine receiving a seed query, the seed query being formed based on a user search query; a query interpretation component that: executes an instantiation of the parameterized query over documents specified by the search results, and responsive to execution of the instantiation of the parameterized query, extracts a set of answer strings from the documents, the answer strings in the set match the linguistic pattern, the structural pattern, and the visual pattern; and an output management component that controls an output provided in responsive to the user search query based on the set of answer strings extracted from the documents.

Example 19

The computing system according to Example 18, wherein: the search engine receives the user search query from an issuer computing device; and the output management component controls the search engine to provide the output in response to the user search query to the issuer computing device.

Example 20

The computing system according to any of Examples 18-19, further comprising: an interaction component that receives the user search query via a user interface; and a seed query builder component that forms the seed query based on the user search query; wherein: the interface component inputs the seed query to the search engine; and the interaction component provides the output in response to the user search query via the user interface.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of controlling execution of an automated search task on search results returned by a search engine, comprising:
    forming a seed query based on a user search query, the user search query received from an issuer computing device via a network, the seed query being formed responsive to identification of the user search query being a repetitive type of search task for which a parameterized query is predefined, and the parameterized query specifies a predefined function that comprises patterns for the automated search task;
    receiving the search results returned by the search engine responsive to the search engine receiving the seed query;
    executing an instantiation of the parameterized query for the automated search task over documents specified by the search results, the instantiation of the parameterized query describes a linguistic pattern, a structural pattern, and a visual pattern, wherein the linguistic pattern specifies at least one of semantic information, sentence structure, or textual content, wherein the structural pattern specifies an alignment of information, and wherein the visual pattern specifies a stylistic feature;
    responsive to execution of the instantiation of the parameterized query, extracting a set of answer strings from the documents, the answer strings in the set match the linguistic pattern, the structural pattern, and the visual pattern; and
    controlling the search engine to provide an output in response to the user search query to the issuer computing device via the network, the output based on the set of answer strings extracted from the documents.

2. The method of claim 1, controlling the search engine to provide the output in response to the user search query to the issuer computing device via the network further comprises:
    selecting a particular answer string from the set of answer strings extracted from the documents; and
    controlling the search engine to provide the particular answer string to the issuer computing device via the network for presentation in response to the user search query.

3. The method of claim 2, further comprising:
    computing respective confidence scores for the answer strings in the set; and
    selecting the particular answer string from the set of answer strings based on the respective confidence scores for the answer strings in the set.

4. The method of claim 1, further comprising:
    identifying respective source search results for the answer strings in the set, a source search result for an answer string specifies a document from which the answer string is extracted; and
    computing respective confidence scores for the answer strings in the set;
    wherein controlling the search engine to provide the output in response to the user search query to the issuer computing device via the network further comprises:
        causing the search engine to rank the search results based on:
            the set of answer strings extracted from the documents;
            the respective source search results for the answer strings in the set; and
            the respective confidence scores for the answer strings in the set; and
        controlling the search engine to provide the search results as ranked to the issuer computing device via the network for presentation in response to the user search query.

5. The method of claim 1, further comprising:
    extracting content around a particular answer string from a document, the particular answer string being extracted from the document, the set of answer strings comprises the particular answer string;
    wherein controlling the search engine to provide the output in response to the user search query to the issuer computing device via the network further comprises:
        controlling the search engine to provide the particular answer string and the content around the particular answer string to the issuer computing device via the network for presentation in response to the user search query.

6. The method of claim 1, further comprising:
evaluating whether the user search query received from the issuer computing device belongs to a micro-segment of queries;
responsive to the user search query being identified as belonging to the micro-segment of queries, forming the seed query for the micro-segment of queries based on the user search query; and
inputting the seed query to the search engine;
wherein the parameterized query is predefined for the micro-segment of queries.

7. The method of claim 1, wherein:
the parameterized query comprises a linguistic expression that describes the linguistic pattern, a structural expression that describes the structural pattern, and a visual expression that describes the visual pattern; and
the linguistic expression, the structural expression, and the visual expression are predefined in a domain-specific language.

8. The method of claim 1, executing the instantiation of the parameterized query for the automated search task over the documents specified by the search results further comprises:
creating a logical table based on features detected from semi-structured data of a particular document, wherein the documents comprise the particular document; and
executing a relational operation over the logical table to return an answer string that matches the structural pattern.

9. The method of claim 1, further comprising:
storing the user search query and the set of answer strings in a storage device.

10. The method of claim 9, further comprising:
tracking a duration of time of the execution of the instantiation of the parameterized query;
prior to completion of the execution of the instantiation of the parameterized query and responsive to the duration of time of the execution of the instantiation of the parameterized query exceeding a threshold time duration: controlling the search engine to provide the search results to the issuer computing device via the network for presentation in response to the user search query;
wherein the execution of the instantiation of the parameterized query continues to the completion to extract the set of answer strings from the documents; and
otherwise, responsive to the completion of the execution of the instantiation of the parameterized query, controlling the search engine to provide the output based on the set of answer strings extracted from the documents to the issuer computing device via the network for presentation in response to the user search query.

11. The method of claim 9, further comprising:
retrieving the set of answer strings from the storage device responsive to a subsequent instance of the user search query; and
controlling the search engine to provide an output in response to the subsequent instance of the user search query based on the set of answer strings retrieved from the storage device.

12. The method of claim 1, further comprising clustering the answer strings in the set based on an application-specific similarity function.

13. A computing system, comprising:
at least one processor; and
memory that comprises computer-executable instructions that, when executed by the at least one processor, cause the at least one processor to perform acts including:
forming a seed query based on a user search query, the user search query received from an issuer computing device via a network, the seed query being formed responsive to identification of the user search query being a repetitive type of search task for which a parameterized query is predefined, and the parameterized query specifies a predefined function that comprises one or more patterns for an automated search task;
receiving search results returned by a search engine responsive to the search engine receiving the seed query;
executing an instantiation of the parameterized query over documents specified by the search results, the instantiation of the parameterized query describes a linguistic pattern, a structural pattern; and a visual pattern, wherein the linguistic pattern specifies at least one of semantic information, sentence structure, or textual content, wherein the structural pattern specifies an alignment of information, wherein the visual pattern specifies a stylistic feature, and wherein executing the instantiation of the parameterized query over the documents specified by the search results further comprises:
creating a logical table based on features detected from semi-structured data of a particular document, wherein the documents comprise the particular document; and
executing a relational operation over the logical table to return an answer string that matches the structural pattern; and
controlling an output provided in response to the user search query based on the answer string that matches the structural pattern.

14. The computing system of claim 13, wherein: the memory further comprises computer-executable instructions that, when executed by the at least one processor, cause the at least one processor to perform acts including:
responsive to execution of the instantiation of the parameterized query, extracting a set of answer strings from the documents, the answer strings in the set match the linguistic pattern, the structural pattern, and the visual pattern.

15. The computing system of claim 13, the logical table being created based on detected grid alignment of bounding boxes of nodes included in the particular document.

16. The computing system of claim 13, the logical table being created based on tags included in the particular document.

17. The computing system of claim 13, the logical table being created based on plain text separators included in the particular document.

18. A computing system, comprising:
at least one processor; and
memory comprising:
a parameterized query that specifies a predefined function for a repetitive type of search task, the parameterized query comprising a linguistic expression that describes a linguistic pattern, a structural expression that describes a structural pattern, and a visual expression that describes a visual pattern, wherein the linguistic pattern specifies at least one of semantic information, sentence structure, or textual content, wherein the structural pattern specifies an alignment of information, and wherein the visual pattern specifies a stylistic feature; and computer-executable instructions that, when executed by the at least one processor, cause the at least one processor to perform acts including:
  forming a seed query based on a user search query, the user search query received from an issuer computing device via a network, and the seed query being formed responsive to identification of the user search query being the repetitive type of search task for which the parameterized query is predefined;
  receiving search results returned by a search engine responsive to the search engine receiving the seed query;
  executing an instantiation of the parameterized query over documents specified by the search results;
  responsive to execution of the instantiation of the parameterized query, extracting a set of answer strings from the documents, the answer strings in the set match the linguistic pattern, the structural pattern, and the visual pattern; and
  controlling an output provided responsive to the user search query based on the set of answer strings extracted from the documents.

19. The computing system of claim 18, wherein:
  the search engine receives the user search query from the issuer computing device via the network; and
  controlling the output provided responsive to the user search query further comprises controlling the search engine to provide the output in response to the user search query to the issuer computing device via the network.

20. The computing system of claim 18, wherein the memory further comprises computer-executable instructions that, when executed by the at least one processor, cause the at least one processor to perform acts including:
  receiving the user search query via a user interface;
  wherein:
    the seed query is inputted to the search engine; and
    the output is provided in response to the user search query via the user interface.

* * * * *